US009584819B2

United States Patent
Wang et al.

(10) Patent No.: US 9,584,819 B2
(45) Date of Patent: Feb. 28, 2017

(54) GROUPING OF TILES FOR VIDEO CODING

(71) Applicant: Qualcomm Incorporated, San Diego, CA (US)

(72) Inventors: Ye-Kui Wang, San Diego, CA (US); Ying Chen, San Diego, CA (US); Muhammed Zeyd Coban, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 684 days.

(21) Appl. No.: 13/658,453

(22) Filed: Oct. 23, 2012

(65) Prior Publication Data
US 2013/0101035 A1 Apr. 25, 2013

Related U.S. Application Data

(60) Provisional application No. 61/550,833, filed on Oct. 24, 2011.

(51) Int. Cl.
*H04N 7/32* (2006.01)
*H04N 19/436* (2014.01)
(Continued)

(52) U.S. Cl.
CPC ........... *H04N 19/436* (2014.11); *H04N 19/17* (2014.11); *H04N 19/174* (2014.11); *H04N 19/70* (2014.11);
(Continued)

(58) Field of Classification Search
CPC ....................................................... H04N 19/70
(Continued)

(56) References Cited

U.S. PATENT DOCUMENTS 8,428,143 B2 * 4/2013 Schwarz et al. ......... 375/240.25
8,654,860 B2 * 2/2014 Huang ................... H04N 19/70
375/240.25
(Continued)

FOREIGN PATENT DOCUMENTS

CN 101389021 A 3/2009
CN 101578865 A 11/2009
(Continued)

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.
(Continued)

*Primary Examiner* — William C Vaughn, Jr.
*Assistant Examiner* — Luis Perez Fuentes
(74) *Attorney, Agent, or Firm* — Shumaker & Sieffert, P.A.

(57) ABSTRACT

Techniques described herein for coding video data include techniques for coding pictures partitioned into tiles, in which each of the plurality of tiles in a picture is assigned to one of a plurality of tile groups. One example method for coding video data comprising a picture that is partitioned into a plurality tiles comprises coding video data in a bitstream, and coding, in the bitstream, information that indicates one of a plurality of tile groups to which each of the plurality of tiles is assigned. The techniques for grouping tiles described herein may facilitate improved parallel processing for both encoding and decoding of video bitstreams, improved error resilience, and more flexible region of interest (ROI) coding.

54 Claims, 11 Drawing Sheets

(51) Int. Cl.
*H04N 19/70* (2014.01)
*H04N 19/174* (2014.01)
*H04N 19/17* (2014.01)
*H04N 19/46* (2014.01)
*H04N 19/61* (2014.01)
*H04N 19/895* (2014.01)

(52) U.S. Cl.
CPC .............. *H04N 19/46* (2014.11); *H04N 19/61* (2014.11); *H04N 19/895* (2014.11)

(58) Field of Classification Search
USPC .................................................. 375/240.12
See application file for complete search history.

(56) References Cited

U.S. PATENT DOCUMENTS

| | | | | |
|---|---|---|---|---|
| 8,767,824 | B2* | 7/2014 | Misra | H04N 19/176 375/240.01 |
| 8,891,615 | B2 | 11/2014 | Karczewicz et al. | |
| 8,908,763 | B2 | 12/2014 | Raveendran | |
| 8,923,394 | B2* | 12/2014 | Priddle | H04N 19/70 375/240.01 |
| 9,001,888 | B2* | 4/2015 | Henry | H04N 19/176 375/240.02 |
| 9,060,174 | B2* | 6/2015 | Horowitz | H04N 19/137 |
| 9,344,743 | B2* | 5/2016 | Sze | H04N 19/70 |
| 2004/0062310 | A1* | 4/2004 | Xue et al. | 375/240.16 |
| 2008/0151997 | A1* | 6/2008 | Oguz | H04N 19/129 375/240.02 |
| 2010/0189181 | A1 | 7/2010 | Zheng et al. | |
| 2011/0206123 | A1* | 8/2011 | Panchal | H04N 19/70 375/240.15 |
| 2011/0249721 | A1* | 10/2011 | Karczewicz | H04N 19/159 375/240.02 |
| 2011/0249731 | A1 | 10/2011 | Zhao et al. | |
| 2012/0014457 | A1 | 1/2012 | He et al. | |
| 2012/0027077 | A1 | 2/2012 | Reznik | |
| 2012/0081241 | A1 | 4/2012 | Misra et al. | |
| 2012/0082218 | A1 | 4/2012 | Misra et al. | |
| 2012/0082241 | A1* | 4/2012 | Tsai et al. | 375/240.25 |
| 2012/0106622 | A1* | 5/2012 | Huang | H04N 19/129 375/240.01 |
| 2012/0201306 | A1 | 8/2012 | Kang et al. | |
| 2012/0207213 | A1 | 8/2012 | Amon | |
| 2012/0230428 | A1* | 9/2012 | Segall | H04N 19/176 375/240.25 |
| 2012/0236936 | A1* | 9/2012 | Segall et al. | 375/240.08 |
| 2013/0016786 | A1* | 1/2013 | Segall | H04N 19/70 375/240.16 |
| 2014/0010300 | A1* | 1/2014 | Rapaka et al. | 375/240.15 |
| 2014/0078250 | A1* | 3/2014 | Zhang et al. | 348/43 |
| 2015/0016512 | A1* | 1/2015 | Pu et al. | 375/240.03 |

FOREIGN PATENT DOCUMENTS

| | | |
|---|---|---|
| CN | 102067608 A | 5/2011 |
| JP | 2005167836 A | 6/2005 |
| JP | 2011509642 A | 3/2011 |
| JP | 2011515880 A | 5/2011 |
| JP | 2011109390 A | 6/2011 |
| WO | 2008143746 A2 | 11/2008 |
| WO | 2009089370 A1 | 7/2009 |
| WO | 2009119888 A1 | 10/2009 |
| WO | 2009158428 | 12/2009 |
| WO | 2011045339 A1 | 4/2011 |
| WO | 2011053020 A2 | 5/2011 |

OTHER PUBLICATIONS

Fuldseth: "Replacing Slices with tiles for high level parallelism", JCT-VC Meeting; MPEG Meeting; Jan. 20, 2011-Jan. 28, 2011;Daegu; (Joint Collaboration Team on Video Coding of ISO/IEC JTC1/SC29/WG11AND ITU-T SG.16); URL: http://wftp3.itu.int/av-arch/jc tvc-site/, No. JCTVC-D227, XP030008267, ISSN: 0000-0013, 4 pp.

International Search Report and Written Opinion—PCT/US2012/061663—ISA/EPO—Feb. 5, 2013, 14 pp.

Lambert, et al., "Flexible macroblock ordering in H.264/AVC", Journal of Visual Communication and Image Representation, Academic Press, Inc, US, vol. 17, No. 2, Apr. 1, 2006 (Apr. 1, 2006), pp. 358-375, XP024905097, ISSN: 1047-3203, DOI: 10.1016/J.JVCIR.2005.05.008.

Wang et al., "AHG4: Tile groups", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G318, XP030110302, 9 pp.

Wang et al., "A Novel Macro-Block Group Based AVS Coding Scheme for Many-Core Processor", Dec. 15, 2009, Advances in Multimedia Information Processing—PCM 2009, pp. 356-367, Springer Berlin Heidelberg, Berlin, Heidelberg, XP019134911, ISBN: 978-3-642-10466-4.

Wenger et al., "FMO: Flexible Macroblock Ordering" , Joint Video Team (JVT) of ISO/IEC MPEG & ITU-T VCEG(ISO/IEC JTC1/SC29/WG11 and ITU-T SG16 Q6), May 6, 2002, XP002308230, 22 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2012/061663, dated Oct. 29, 2013, 5 pp.

International Preliminary Report on Patentability from International Application No. PCT/US2012/061663, dated Feb. 13, 2014, 8 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d21, 290 pp.

Bross et al., "High efficiency video coding (HEVC) text specification draft 8," 10th Meeting: Stockholm, SE, Jul. 11-20, 2012, JCTVC-J1003_d7, 261 pp.

Wenger et al., "Adaptation Parameter Set (APS)," JCTVC-F474r3, 6th Meeting: Torino, IT, Jul. 14-22, 2011, 10 pp.

Fuldseth et al., "Input Document to JCT-VC," JCTVC-F335, 6th Meeting: Torino, IT, Jul. 14-22, 2011, 15 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Fuldseth et al., "Tiles," Joint Collaborative Team on Video Coding, JCTVC-F335 PowerPoint, Jul. 14-22, 2011, 12 slides.

Fuldseth, et al., "Tiles", Joint Collaborative Team on Video Coding (JCT-VC) of ITU-T SG16 WP3 and ISO/IEC JTC1/SC29/WG11 5th Meeting: Geneva, CH, Mar. 16-23, 2011, U.S., JCTVC, Mar. 11, 2011, JCTVC-E408_r1, 14 pp.

First Office Action, and translation thereof, from counterpart Japanese Patent Application No. 2014-538921, mailed Apr. 21, 2015, 11 pp.

(56) References Cited

OTHER PUBLICATIONS

Davies, "Unified Scan Processing for High Efficiency Coefficient Coding", JCT-VC Meeting; MPEG Meeting; Jan. 20-28, 2011; Daegu; (Joint Collaborative Team on Video Coding of ITU-T SG 16 WP3 and ISO/IEC JTC1/SC29/WG11) ; Jan. 15, 2011, No. JCTVC-D219, XP030008259, ISSN: 0000-0013; 7 pp.
Sasai et al: "Parallel Context Processing for Significance map using block-based context updates", JCTVC-E226, Mar. 16-23, 2011, Joint Collaborative Team on Video Coding (JCT-VC) of ITU-T SG16 WP3 and ISO/IEC JTC1/SC29/WG11, 5th Meeting: Geneva (Switzerland), Mar. 10, 2011, XP030008732, 4 pp.
Sole, et al., "CE11: Unified scans for the significance map and coefficient level coding in high efficiency", JCTVC-F288, Jul. 14-22, 2011; Dec. 11, 2012, 9 pp.
Sole, et al.,"Parallel processing of residual data in HE", JCT-VC Meeting; MPEG Meeting; Jul. 14-22, 2011; Torino; (Joint Collaborative Team on Video Coding of ISO / IEC JTCI/SC29/WGII and ITU-T SG. 16) ; URL: http://wftp3.itu.int/av-arch/jctvc-site/, No. JCTVC-F552, Jul. 16, 2011, XP03000957, 6 pp.
Winken, et al., "Description of Video coding technology proposal by Fraunhofer HHI," JCTVC-A116 Meeting; Apr. 15-23, 2010; Dresden; (Joint Collaborative Team on Video Coding of ISO/IEC JTC1/SC29/WG11 and ITU-TSG. 16) ; URL: http://wftp3. itu.int/av-arch/jctvc-site/, no., Apr. 24, 2010, 44 pp., XP030007557.
Notice of Grounds for Rejection, and translation thereof, counterpart Korean Application No. 2014-7013810, dated Nov. 23, 2015, 15 pp.

\* cited by examiner

- Tile Group 1

- Tile Group 2

- Tile Group 1

- Tile Group 2

- Tile Group 3

GROUPING OF TILES FOR VIDEO CODING

This application claims the benefit of U.S. Provisional Application Ser. No. 61/550,833, filed Oct. 24, 2011, the entire content of which is incorporated herein by reference.

TECHNICAL FIELD

This disclosure relates to video coding, and more particularly to techniques for coding pictures partitioned into tiles.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

Techniques described herein for coding video data include techniques for coding pictures partitioned into tiles, in which each of the plurality of tiles in a picture is assigned to one of a plurality of tile groups. Information may be included in a bitstream that indicates the tile group to which each tile in a picture is assigned. In some examples, the information included in the bitstream may take the form of a tile group ID for each tile, indicating the tile group to which the tile is assigned. The techniques for grouping tiles described herein, in various examples, may facilitate improved parallel processing for both encoding and decoding of video bitstreams, improved error resilience, and more flexible region of interest (ROI) coding.

In one example, a method of coding video data comprising a picture that is partitioned into a plurality tiles comprises coding the video data in a bitstream, and coding, in the bitstream, information that indicates one of a plurality of tile groups to which each of the plurality of tiles is assigned.

In another example, a device for coding video data comprising a picture that is partitioned into a plurality tiles is configured to code video data in a bitstream, and code, in the bitstream information that indicates one of a plurality of tile groups to which each of the plurality of tiles is assigned.

In another example, a device for coding video data comprising a picture that is partitioned into a plurality tiles comprises means for coding the video data in a bitstream, and means for coding, in the bitstream, information that indicates one of a plurality of tile groups to which each of the plurality of tiles is assigned.

In another example, a computer-readable storage medium has stored thereon instructions that, when executed, cause a processor of a device for coding video data comprising a picture that is partitioned into a plurality tiles to code the video data in a bitstream, and code, in the bitstream, information that indicates one of a plurality of tile groups to which each of the plurality of tiles is assigned.

The details of one or more examples are set forth in the accompanying drawings and the description below. Other features, objects, and advantages will be apparent from the description and drawings, and from the claims.

DETAILED DESCRIPTION

Figure 1:
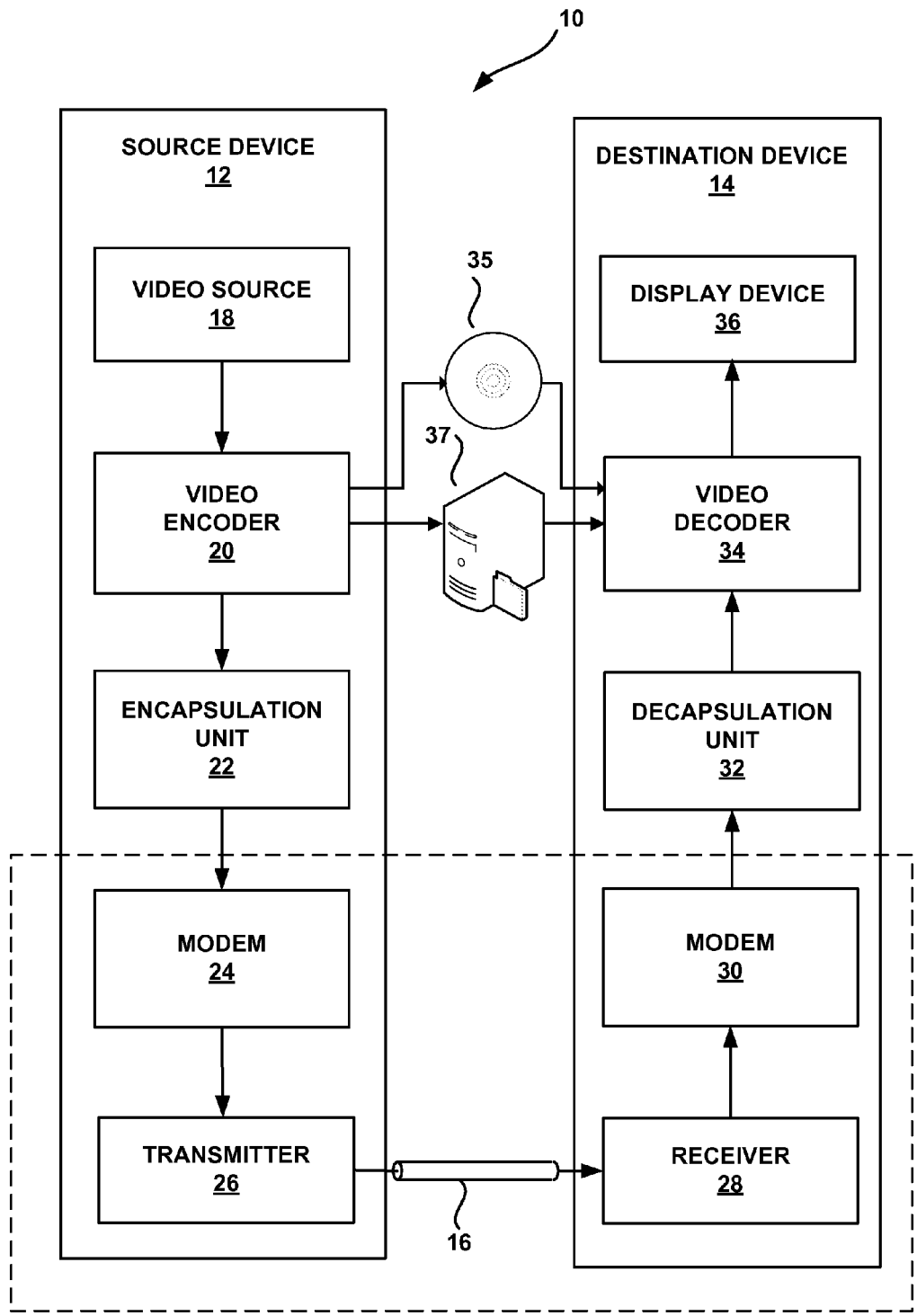
FIG. 1 is a block diagram illustrating an example video encoding and decoding system

In general, this disclosure describes techniques for coding video data. In particular, this disclosure describes techniques for coding pictures partitioned into tiles, in which each of the plurality of tiles in a picture is assigned to one of a plurality of tile groups. The techniques for grouping tiles described herein may facilitate improved parallel processing for both encoding and decoding of video bitstreams. In some examples, the techniques may promote improved error resilience and/or more flexible region of interest (ROI) coding.

Digital video devices implement video compression techniques to encode and decode digital video information more efficiently. There is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 6" or "WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of Jun. 1, 2012, is downloadable from http://phenix.int-evry.fr/jct/doc_end_user/documents/8_San%20Jose/wg11/JCTVC-H1003-v22.zip.

For video coding according to the current working draft of HEVC, as one example, a video frame may be partitioned into coding units. A coding unit (CU) generally refers to an image region that serves as a basic unit to which various coding tools are applied for video compression. A CU usually has a luminance component, which may be denoted as Y, and two chroma components, which may be denoted as Cr and Cb. Depending on the video sampling format, the size of the Cr and Cb components, in terms of number of samples, may be the same as or different from the size of the Y component. A CU is typically square, and may be considered to be similar to a so-called macroblock, e.g., under other video coding standards such as ITU-T H.264.

To achieve better coding efficiency, a coding unit may have variable sizes depending on video content. In addition, a coding unit may be split into smaller blocks for prediction or transform. In particular, each coding unit may be further partitioned into prediction units (PUs) and transform units (TUs). Prediction units may be considered to be similar to so-called partitions under other video coding standards, such as H.264. Transform units (TUs) refer to blocks of residual data to which a transform is applied to produce transform coefficients. The residual data may include pixel difference values in the spatial domain. A transform is used to transform the residual data to a transform domain, such as a frequency domain.

Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes, particularly to the extent coding of video data arranged in tiles is specified.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU.

An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block", "partition," or "portion" to refer to any of a CU, PU, or TU, depending on context. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include motion information defining a motion vector for the PU. The motion information may describe, for example, a horizontal component of the motion vector, a vertical component of the motion vector, a resolution for the motion vector (e.g., one-quarter pixel precision or one-eighth pixel precision), a prediction direction that specifies a reference list (e.g., list 0 or list 1) including the reference frame to which the motion vector points, and a reference index value indicating the particular reference frame within the specified list of reference frames to which the motion vector points. Data for the leaf-CU defining the PU(s) may also describe, for example, partitioning of the CU into one or more PUs. Partitioning modes may differ depending on whether the CU is not predictively coded, intra-prediction mode encoded, or inter-prediction mode encoded.

To code a block (e.g., a prediction unit (PU) of video data), a predictor for the block is first derived. The predictor can be derived either through intra (I) prediction (i.e. spatial prediction) or inter (P or B) prediction (i.e. temporal prediction). Hence, some prediction units may be intra-coded (I) using spatial prediction with respect to neighbouring reference blocks in the same frame, and other prediction units may be inter-coded (P or B) with respect to reference blocks in other frames.

Upon identification of a predictor, the difference between the original video data block and its predictor is calculated. This difference is also called the prediction residual, and refers to the pixel differences between the pixels of the block to be coded and corresponding reference samples (which may be integer-precision pixels or interpolated fractional-precision pixels) of the reference block, i.e., the predictor. To achieve better compression, the prediction residual (i.e., the array of pixel difference values) is generally transformed, e.g., using a discrete cosine transform (DCT), integer transform, Karhunen-Loeve (K-L) transform, or other transform.

Coding a PU using inter-prediction involves calculating a motion vector between a current block and a block in a reference frame. Motion vectors are calculated through a process called motion estimation (or motion search). A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may be interpolated, in whole or in part, and occur at a fractional pixel position. Upon finding an actual or interpolated portion of the reference frame that best matches the current portion, the encoder determines the current motion vector for the current portion as the difference in the location from the current portion to the matching portion in the reference frame (e.g., from the center of the current portion to the center of the matching portion).

In some examples, an encoder may signal the motion vector for each portion in the encoded video bitstream. The signaled motion vector is used by the decoder to perform motion compensation in order to decode the video data. However, signaling the original motion vector directly may result in less efficient coding, as a large number of bits are typically needed to convey the information.

Once motion estimation is performed to determine a motion vector for a current portion, the encoder compares the matching portion in the reference frame to the current portion. This comparison typically involves subtracting the portion (which is commonly referred to as a "reference sample") in the reference frame from the current portion, and results in so-called residual data, as mentioned above. The residual data indicates pixel difference values between the current portion and the reference sample. The encoder then transforms this residual data from the spatial domain to a transform domain, such as the frequency domain. Usually, the encoder applies a discrete cosine transform (DCT) to the residual data to accomplish this transformation. The encoder performs this transformation in order to facilitate the compression of the residual data, because the resulting transform coefficients represent different frequencies, wherein the majority of energy is usually concentrated on a few low frequency coefficients.

Typically, the resulting transform coefficients are grouped together in a manner that enables run-length encoding, especially if the transform coefficients are first quantized (rounded). The encoder performs this run-length encoding of the quantized transform coefficients and then performs statistical lossless (or so-called "entropy") encoding to further compress the run-length coded quantized transform coefficients. After performing lossless entropy coding, the encoder generates a bitstream that includes the encoded video data.

The HM also enables partitioning of pictures, i.e., frames, into tiles. Tiles ordinarily will be rectangular, and are rectangular in the HM. Although the techniques described in this disclosure could be used with non-rectangular tiles, the use of rectangular tiles will be described for purposes of illustration. A picture may be partitioned into tiles by a number of vertical tile boundaries and a number of horizontal tile boundaries that partition a picture into columns and rows, respectively. Intersecting column and row boundaries delineate the rectangular tiles. The two vertical picture boundaries (edges or ends of the picture or frame) can be considered as two vertical tile boundaries and the two horizontal picture boundaries (edges or ends of the picture or frame) can be considered as two horizontal tile boundaries. As one example, if there are 4 vertical tile boundaries (including the vertical picture boundaries) and 3 horizontal tile boundaries (including the horizontal picture boundaries), then the picture is partitioned into $(4-1) \times (3-1) = 6$ tiles. The spacing between vertical and horizontal tile boundaries may, but need not be, uniform.

The decoding order of tiles within a picture is the tile raster scan order. Inside each tile, the decoding order of LCUs is the LCU raster scan order. Each tile may consist of an integer number of LCUs.

In-picture prediction, including pixel value prediction, motion prediction, coding mode prediction, and entropy coding context prediction, across all tile boundaries is controlled by the flag tile_boundary_independence_idc. If the flag tile_boundary_independence_idc is equal to 1, in-picture prediction across tile boundaries is disallowed. Otherwise, if the flag tile_boundary_independence_idc is equal to 0, in-picture prediction across tile boundaries is allowed, except for the tile boundaries that are also picture boundaries or slice boundaries.

When in-picture prediction is allowed, tiles function to change the LCU scan order compared to the case where there are no tiles, or equivalently, where there is only one tile in a picture. When in-picture prediction is disallowed, tiles also provide independent partitioning that can enable, for example, parallel processing (encoding and/or decoding) by different processing cores.

The HM also enables partitioning of pictures, i.e., frames, into slices. A slice consists of an integer number of LCUs in raster scan order. Unlike tiles, the boundaries between slices are not necessarily vertical and/or horizontal lines across a picture, and slices are accordingly not necessarily rectangular. A slice corresponds to a single network abstraction layer (NAL) unit, and in-picture prediction is not permitted across slice boundaries.

A slice (or NAL) may include more than one tile, or a tile may include more than once slice. When a slice contains LCUs in more than one tile, the tiles containing the LCUs shall be contiguous. Tiles T and T+1 are said to be contiguous if the first LCU in T+1 immediately follows, in transmission order, the last LCU in T. The use of tiles in an HEVC coding process are further described in Fuldseth et al., "Tiles," Joint Collaborative Team on Video Coding (JCTVC) document JCTVC-F335, dated Jun. 30, 2011, the entire content of which is hereby incorporated by reference.

As discussed above, according to the HM, the coding order for tiles is the tile raster scan order. However, the tile raster scan order may be associated with a number of disadvantages, particularly when in-picture prediction is disallowed across tile boundaries, e.g., to facilitate parallel processing or ROI coding.

For example, when tiles are used to facilitate parallel processing, tile raster scan order may require that coded video data for each tile be included in a separate NAL unit. As a result, the NAL units used for the individual tiles may be significantly smaller than the maximum transmission unit (MTU) size, and the efficiency of the coded bitstream may be reduced by the overhead associated with the multiplicity of NAL units. Furthermore, in an error prone environment, the loss of a plurality of these NAL units may lead to loss of the ability to reconstruct missing CUs from neighboring CUs using error concealment techniques, (e.g., interpolation-based error concealment techniques).

As another example, tiles may be used to provide an independently decodable sub-picture, such as an ROI. In such cases, it may be desirable to place the coded video data of the ROI in the bitstream prior to the coded video data of the remainder of the picture. However, the ROI is rarely located in the picture such that its coded video data would be first when tiles are coded in tile raster scan order, as specified by the HM. Rather, the ROI may be in the center of the picture, or at least not likely in the uppermost part of the picture, i.e., where the tile raster scan would start.

According to the tile grouping techniques described herein, each of the plurality of tiles in a picture is assigned to one of a plurality of tile groups. The techniques for grouping tiles described herein may facilitate improved parallel processing for both encoding and decoding of video bitstreams, improved error resilience, and/or more flexible region of interest (ROI) coding.

FIG. 1 is a block diagram illustrating an example video encoding and decoding system 10 that may be configured to utilize techniques for tile grouping, as described herein. As shown in FIG. 1, the system 10 includes a source device 12 that transmits encoded video to a destination device 14 via a communication channel 16. Encoded video data may also be stored on a storage medium 35 or a file server 37 and may be accessed by the destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 34, such as a network interface, CD or DVD reader, or the like, may retrieve coded video data from a storage medium and provided the retrieved data to video decoder 34.

The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 37 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for tile grouping in a video coding process, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 1, the source device 12 includes a video source 18, a video encoder 20, an encapsulation unit 22, a modulator/demodulator 24 and a transmitter 26. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by the video encoder 20. The encoded video information may be modulated by the modem 24 according to a communication standard, such as a wireless communication protocol, and transmitted to the destination device 14 via the transmitter 26. The modem 24 may include various mixers, filters, amplifiers or other components designed for signal modulation. The transmitter 26 may include circuits designed for transmitting data, including amplifiers, filters, and one or more antennas.

The captured, pre-captured, or computer-generated video that is encoded by the video encoder 20 may also be stored onto a storage medium 35 or a file server 37 for later consumption. The storage medium 35 may include Blu-ray discs, DVDs, CD-ROMs, flash memory, or any other suitable digital storage media for storing encoded video. The encoded video stored on the storage medium 35 may then be accessed by the destination device 14 for decoding and playback.

The file server 37 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 37 may be a streaming transmission, a download transmission, or a combination of both. The file server 37 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 1, includes a receiver 28, a modem 30, a video decoder 34, and a display device 36. The receiver 28 of the destination device 14 receives information over the channel 16, and the modem 30 demodulates the information to produce a demodulated bitstream for the video decoder 34. The information communicated over the channel 16 may include a variety of syntax information generated by the video encoder 20 for use by the video decoder 34 in decoding video data. Such syntax may also be included with the encoded video data stored on the storage medium 35 or the file server 37. Each of the video encoder 20 and the video decoder 34 may form part of a respective encoder-decoder (CODEC) that is capable of encoding or decoding video data.

The display device 36 may be integrated with, or external to, the destination device 14. In some examples, the destination device 14 may include an integrated display device and also be configured to interface with an external display device. In other examples, the destination device 14 may be a display device. In general, the display device 36 displays the decoded video data to a user, and may comprise any of a variety of display devices such as a liquid crystal display (LCD), a plasma display, an organic light emitting diode (OLED) display, or another type of display device.

In the example of FIG. 1, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 34 may operate according to a video compression standard, such as the HEVC standard presently under development, and may generally conform to a current or final HM associated with HEVC. Alternatively, the video encoder 20 and the video decoder 34 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, the video encoder 20 and the video decoder 34 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 34 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 34 may be included in one or more encoders or decoders, either of which may be integrated as part of a combined encoder/decoder (CODEC) in a respective device. A video coder, as described in this disclosure, may refer to a video encoder or a video decoder. Similarly, a video coding unit may refer to a video encoder or a video decoder. Likewise, video coding may refer to video encoding or video decoding.

As illustrated in FIG. 1, source device 12 may comprise an encapsulation unit 22, and destination device 14 may comprise a decapsulation unit 32. Encapsulation unit 22 and decapsulation unit 32 represent examples of processing units that may implement the techniques described herein for grouping tiles.

For example, video encoder 20 may partition a picture into tiles, group the tiles, and encode the video data of the picture according to the partitioning into tiles and grouping of the tiles. In some examples, parallel processing cores of video encoder 20 may respectively encode the video data from different groups of tiles. Encapsulation unit 22 may be configured to place the encoded video data from the tiles into the bitstream in an order in accordance with the grouping of the tiles, and place syntax information into a bitstream that indicates how the picture was partitioned into tiles and how the tiles are grouped.

Decapsulation unit 32 may receive the encoded video data and syntax information for the tiles and tile grouping, and provide the encoded video data for the tiles to decoder 34 in accordance with the tile grouping syntax information. For example, decapsulation unit 32 may direct the encoded video data for different tile groups to different parallel processing cores of decoder 34 based on the tile grouping syntax. Decoder 34 may decode the encoded video data in accordance with the syntax information for the tiles and other syntax information.

Figure 2A:
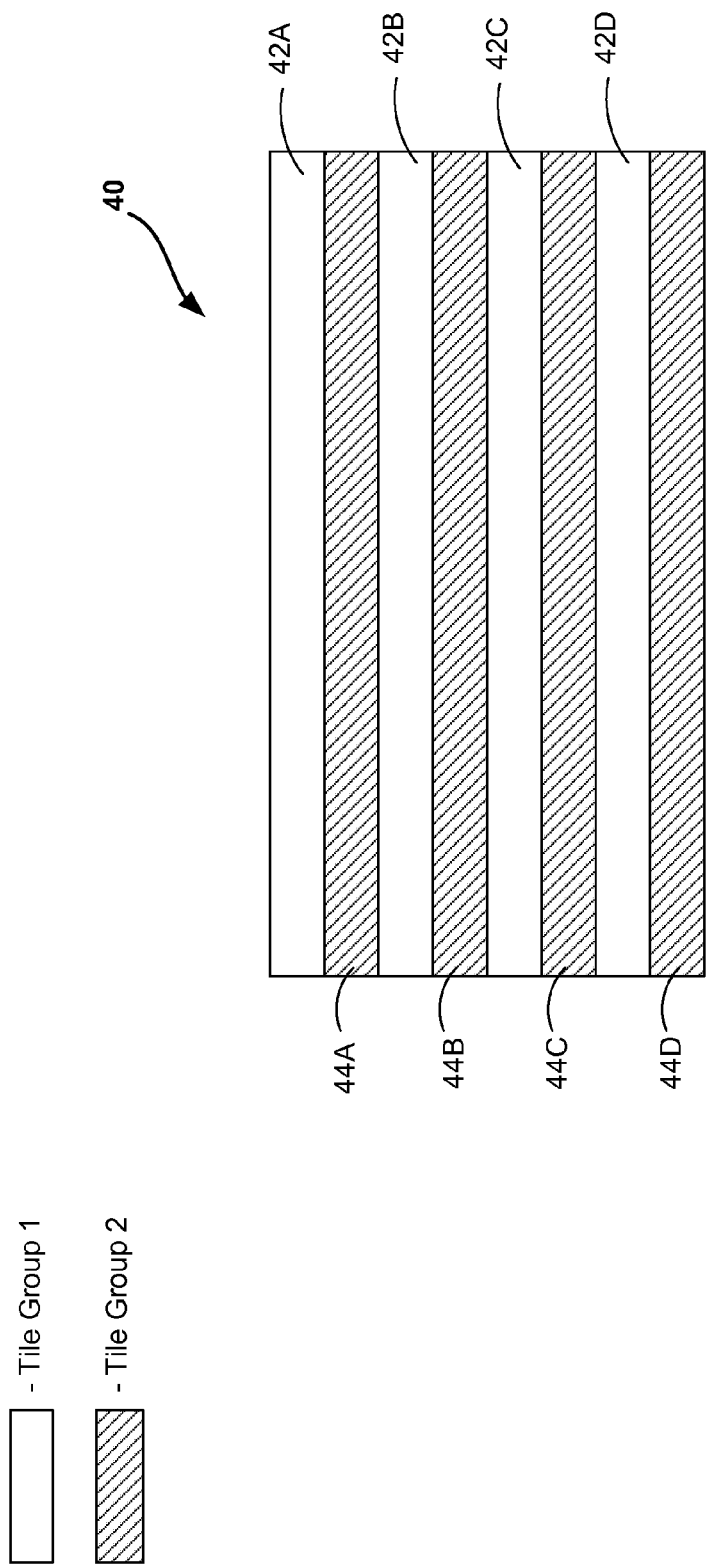
FIGS. 2A-2D are conceptual diagrams illustrating example pictures that are partitioned into tiles, where each of the tiles is assigned to one of a plurality of tile groups.

FIGS. 2A-2D are conceptual diagrams illustrating example pictures that are partitioned into tiles, where each of the tiles is assigned to one of a plurality of tile groups. For example, FIG. 2A illustrates an example picture 40 that is partitioned into eight horizontal tiles 42A-D and 44A-D by seven horizontal boundaries (in addition to the two horizontal picture boundaries). Tiles 42A-D are a first tile group, and tiles 44A-D are a second tile group. In the example of FIG. 2A, tiles 42A-D from the first tile group are interleaved with tiles 44A-D of the second tile group, i.e., on an alternating basis.

In some examples, encoder 20 may disallow in-picture prediction across the tile boundaries so that two parallel processing cores of encoder 20 and/or decoder 34 may independently encode or decode the first group of tiles 42A-D and the second group of tiles 44A-D, respectively. If tiles 42A-D and 44A-D were not grouped in the manner illustrated in FIG. 2A, the video data for the tiles would be coded, and transmitted or received, in tile raster scan order, i.e., tile 42A, tile 44A, tile 42B, tile 44B, etc. Hence, decoder 34 would decode the coding units in the tiles in the same order, i.e., tile 42A, tile 44A, tile 42B, tile 44B, etc. In such a case, tile raster scan order would necessitate that a separate NAL unit be generated for each of the tiles, i.e., eight NAL units for the eight tiles 42A-D and 44A-D. The generation and transmission of eight NAL units for the encoded video data of picture 40 may be less efficient than is possible according to the techniques of this disclosure, e.g., because each NAL unit would be significantly smaller than the MTU size and more overhead would be presented by multiple NAL units relative to a smaller number of NAL units. For example, header and/or other information for each of the eight NAL units would need to be included in the bitstream, increasing overhead.

However, grouping of tiles 42A-D into a first tile group and tiles 44A-D into a second tile group may enable the encoded video data for picture 40 to be transmitted using a fewer number of NAL units. For example, if tiles 42A-42D could be combined to produce a NAL unit having a size that is less than or equal to the MTU size, then tiles 42A-42B could be combined in a single NAL unit. The same would be true for tiles 44A-44D. Hence, in this example, encoder 20 may produce and decoder 34 may receive two NAL units, i.e., a first NAL unit for tiles 42A-D of the first tile group, and a second NAL unit for tiles 44A-D of the second tile group. The two NAL units may be closer to the MTU size and would necessitate only two NAL headers for the encoded video data of picture 40. In various examples, two, three, four or more tiles of a tile group may be included in a NAL unit, depending on the size of the tiles and the MTU size, and additional tiles for the group may be included in additional NAL units. In other words, more than one NAL unit may be needed to for the tiles of a group. However, grouping of tiles according to this disclosure may allow the number of NAL units needed for a picture to be reduced relative to coding tiles in tile raster scan order.

In some examples, encoder 20 may place the coded video data for the two tile groups into respective coded slices, which encapsulation unit 22 may then encapsulate into respective packets, e.g., Real-time Transport Protocol (RTP) packets. Hence, in some examples, a group of tiles may be presented together in a slice, which then may be provided in a single NAL unit. The NAL unit may be divided into one or more packets. Because the tile groups include tiles that are spatially interleaved with one another within picture 40, as illustrated in FIG. 2A, if one of the packets gets lost, decoder 34 may still be able to reconstruct the regions covered by the tiles in the lost packet using the decoded tiles in the received packet or packets. Decoder 34 may reconstruct the regions covered by the tiles in the lost packet using any of a variety error concealment techniques. In error concealment, if a missing CU has one or more neighboring CUs that are received and can be correctly decoded, decoder 34 may reconstruct the missing CU using the correctly decoded neighboring CUs, e.g., via interpolation. Placing interleaved groups of tiles in respective packets increases the likelihood that, if one of the packets is lost, there will be neighboring CUs available for error concealment of CU's carried in the other packet.

Figure 2B:
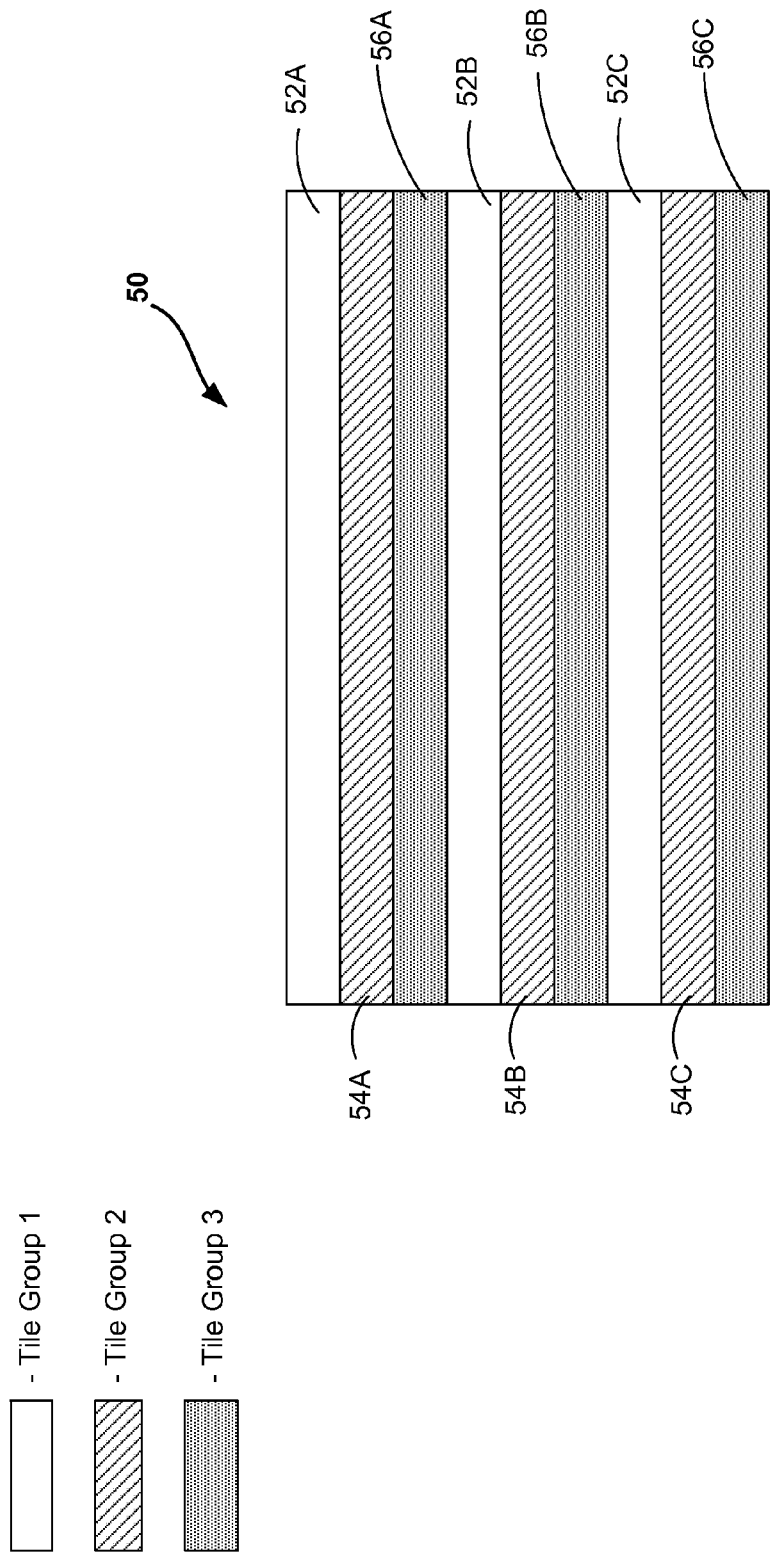
Figure 2C:
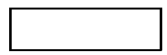
Figure 2C:
Figure 2C:
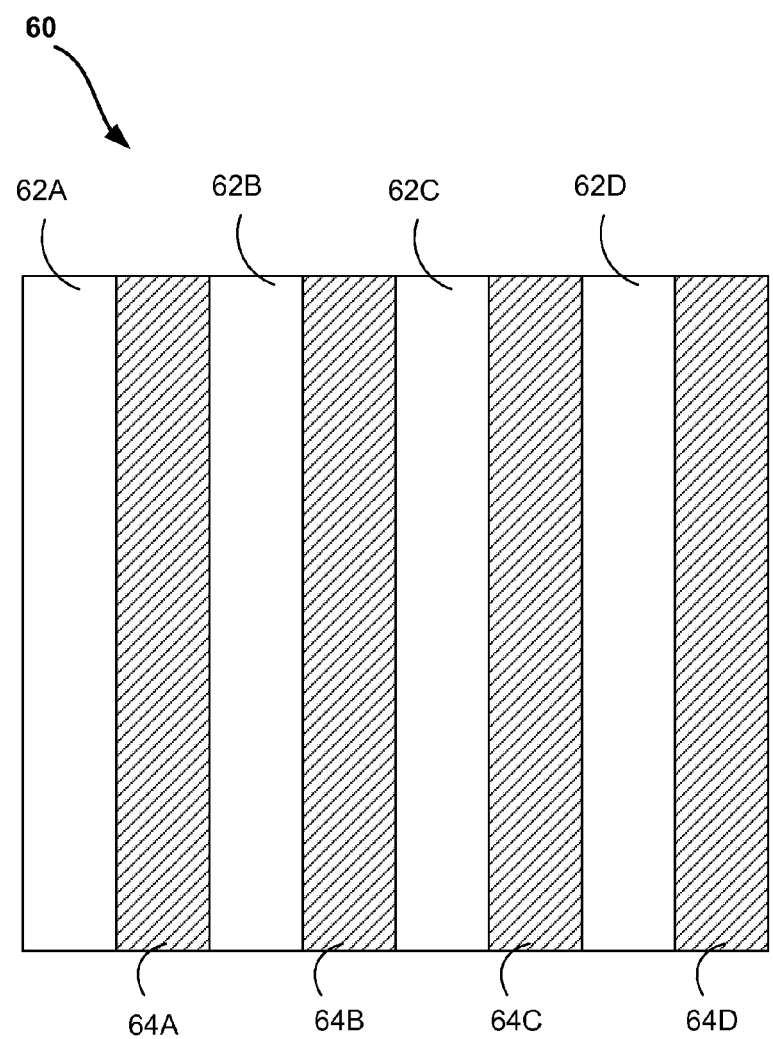
Figure 2D:
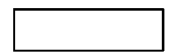
Figure 2D:
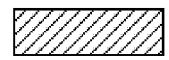
Figure 2D:
Figure 2D:
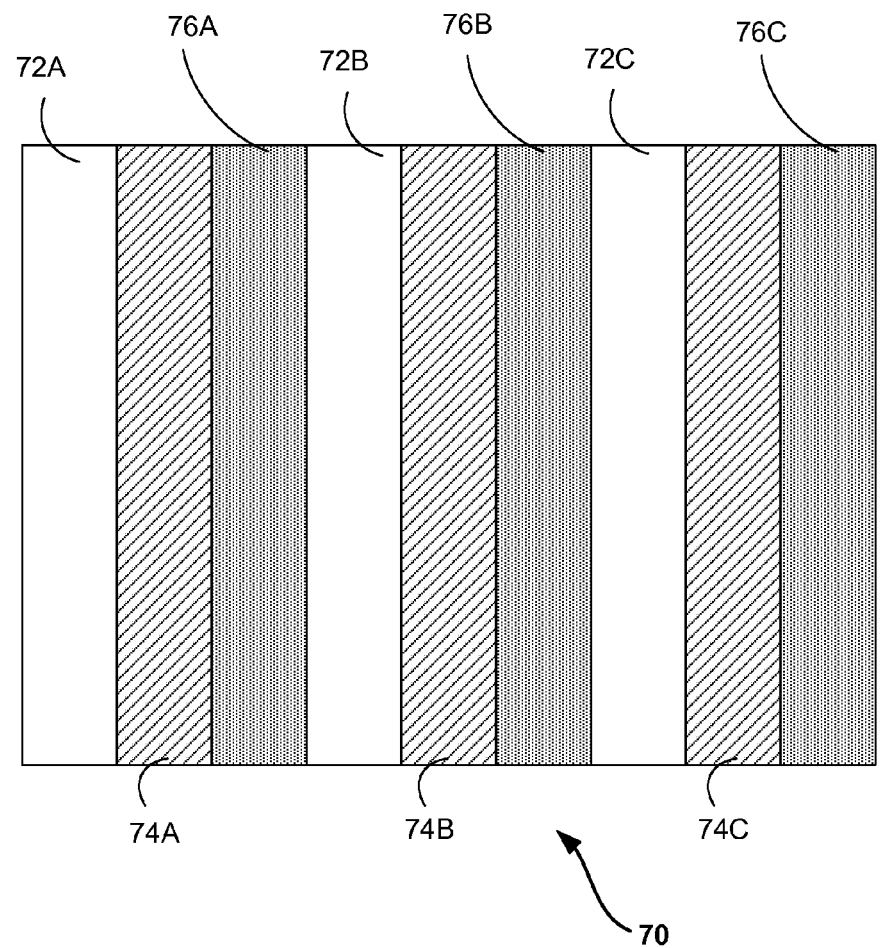

FIGS. 2B-2D illustrate other example pictures that are partitioned into tiles, where each tile is assigned to one of a plurality of tile groups, and each tile group includes a plurality of tiles. Similar to the grouping of tiles of FIG. 2A discussed above, the groupings of tiles illustrated in FIGS. 2B-2D may provide advantages with respect to parallelization efficiency and error resilience.

For example, FIG. 2B illustrates an example picture 50 that is partitioned into nine horizontal tiles 52A-C, 54A-C and 56 A-C by eight horizontal tile boundaries (in addition to the two horizontal picture boundaries). Tiles 52A-C are a first tile group, tiles 54A-C are a second tile group, and tiles 56A-C are a third tile group. In the example of FIG. 2B, the tiles of the three tile groups are interleaved.

Grouping of tiles 52A-C, 54A-C and 56 A-C into respective ones of three tile groups may enable the encoded video data for picture 50 to be transmitted using a fewer number of NAL units, which may be closer to the MTU size and would necessitate fewer NAL headers for the encoded video data of picture 50. Additionally, in some examples, encoder 20 may place the coded video data for the three tile groups into respective coded slices, which encapsulation unit 22 may then encapsulate into respective packets, which may facilitate reconstruction by decoder 34 using any of a variety of error concealment techniques if one or more of the packets is lost, as discussed above with respect to FIG. 2A.

Grouping of tiles 52A-C, 54A-C and 56 A-C into respective ones of three tile groups may also facilitate parallel processing or coding of the video data for picture 50 by parallel processing cores of a video encoder or decoder. Parallel processing cores of an encoder or decoder may be parallel hardware cores, or parallel processing threads executing on a single hardware core. Parallel processing may include coding at least some portion of the video data associated with tiles assigned to different groups by respective processing cores at substantially the same time. For parallel processing, the processing cores could, but do not necessarily start or end coding video data of the picture at the same time. However, during at least a portion of the parallel processing, the cores are coding simultaneously.

FIG. 2C illustrates an example picture 60 that is partitioned into eight vertical tiles 62A-D and 64A-D by seven vertical tile boundaries (in addition to the two vertical picture boundaries). Tiles 62A-D are a first tile group, and tiles 64A-D are a second tile group. In the example of FIG. 2C, the tiles of the two groups are interleaved.

FIG. 2D illustrates an example picture 70 that is partitioned into nine vertical tiles 72A-C, 74A-C and 76A-C by eight vertical tile boundaries (in addition to the two vertical picture boundaries). Tiles 72A-C are a first tile group, tiles 74A-C are a second tile group, and tiles 76A-C are a third tile group. In the example of FIG. 2D, the tiles of the three groups are interleaved.

Figure 3:
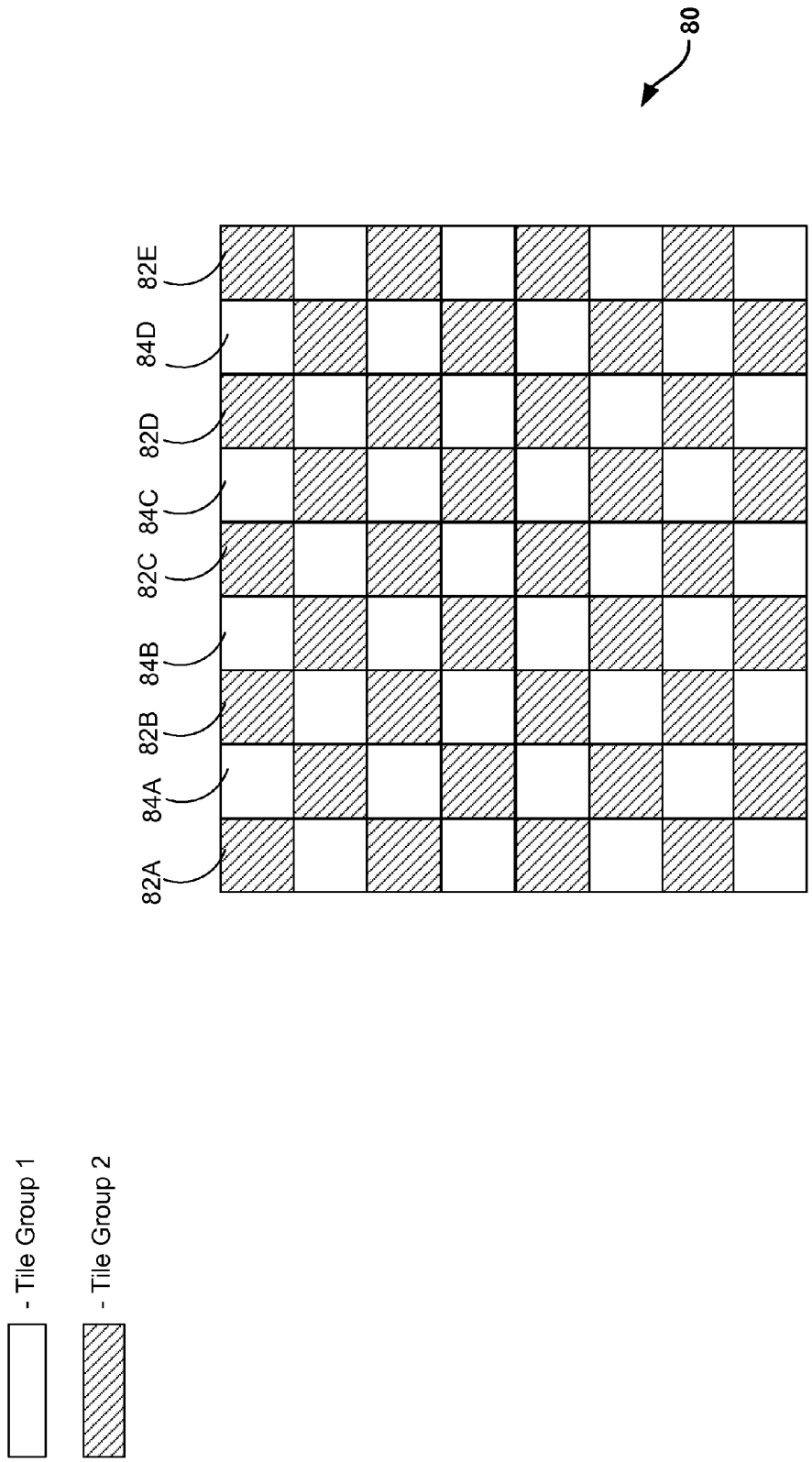
FIG. 3 is a conceptual diagram illustrating an example picture that is partitioned into a plurality of tiles, where each of the tiles is assigned to one of two tile groups, and one of the tile groups corresponds to an ROI.

FIG. 3 is a conceptual diagram illustrating another example picture 80 that is partitioned into a plurality of tiles, where each of the tiles is assigned to one of two tile groups. In the illustrated example, picture 80 is partitioned into seventy-two tiles by eight vertical tile boundaries and seven horizontal tile boundaries (in addition to the two vertical and two horizontal picture boundaries. Each of the hatched or empty squares illustrated in FIG. 3 is a tile. Of the seventy-two tiles, tiles 82A-E of a first tile group, and tiles 84A-D of a second tile group are labeled for ease of illustration. As illustrated in FIG. 3, the tiles of the two groups alternate in a "checkerboard" pattern. Like the groupings illustrated in FIGS. 2A-2D, the grouping of tiles illustrated in FIG. 3 may provide advantages with respect to parallelization efficiency and error resilience.

Figure 4:
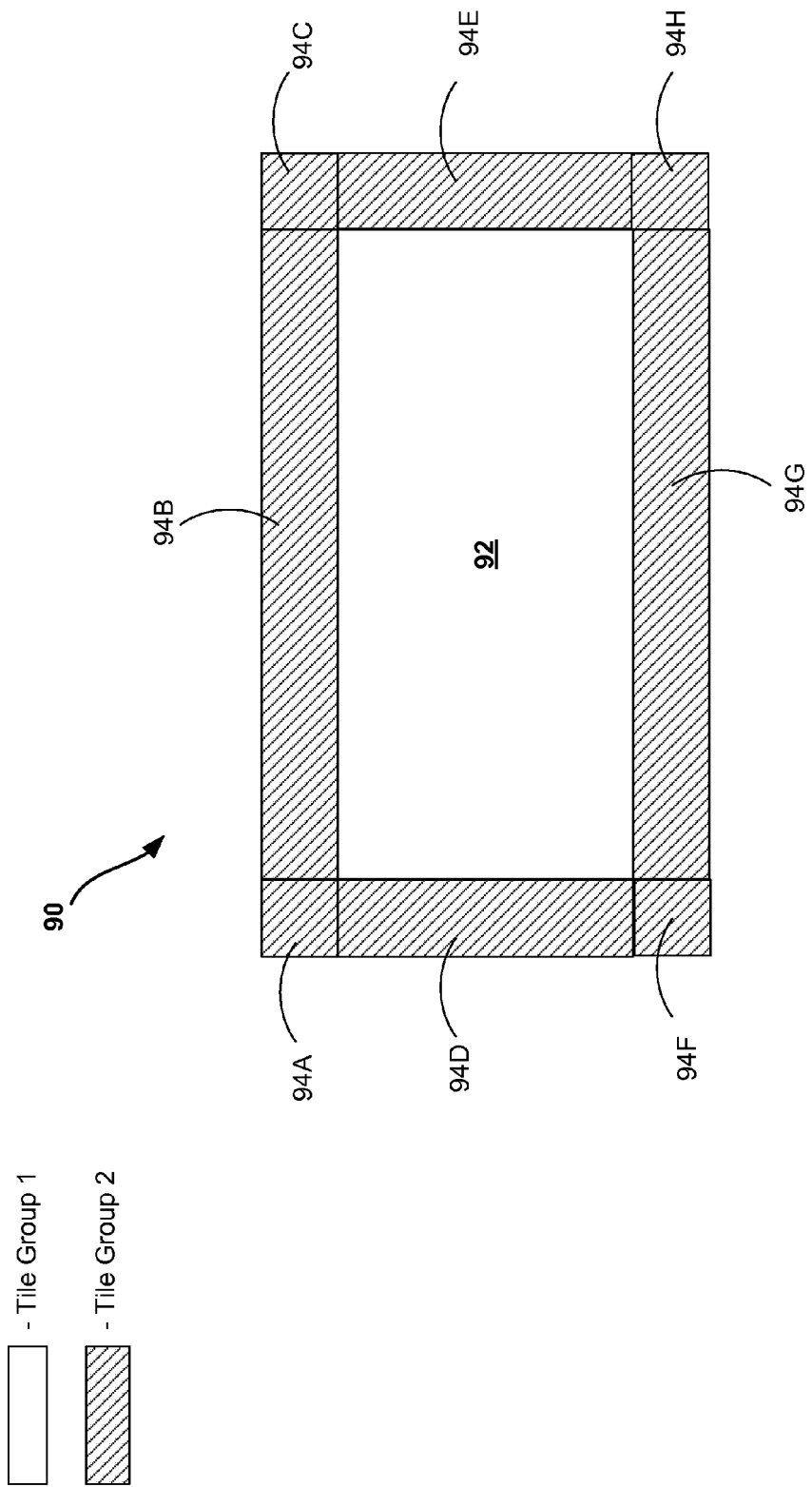
FIG. 4 is a conceptual diagram illustrating another example picture that is partitioned into a plurality of tiles, where each of the tiles is assigned to one of two tile groups.

FIG. 4 is a conceptual diagram illustrating an example picture 90 that is partitioned into a plurality of tiles 92 and 94A-H by two horizontal tile boundaries and two vertical tile boundaries. Tile 92 is a first tile group, and tiles 94A-H are a second tile group. Hence, the first tile group includes a single tile in this example. Although the example of FIG. 4 includes a single tile 92 in the first tile group, other examples may include two or more tiles 92 in the first tile group.

In some examples, each picture in a sequence of pictures is partitioned in the manner illustrated in FIG. 4, and a subset of the tiles, e.g., tile 92 in FIG. 4, covers the same rectangular region in all the pictures in the sequence of pictures. This rectangular region for all the pictures can be decoded independently of other regions from the same picture and other pictures. Such a region may be referred to as an independently decodable sub-picture. Such a region may be the only ROI for some clients, e.g., due to user preference, limited decoding capability of destination device 14, or limited network bandwidth for communication channel 16 between file server 37 and destination device 14.

A client associated with destination device 14 may choose to request the transmission of only coded video data that is sufficient to decode this ROI, or request that video decoder 34 discard (or not attempt to recover loss of) the video data outside this ROI. In order to facilitate such preferential decoding of the coded video data for the ROI, encapsulation unit 22 may place the coded video data of the tile or tiles covering the ROI, e.g., tile 92 in FIG. 4, before the coded video data for other tiles in bitstream, and/or place the coded video data for the ROI in separate slice, packet, or NAL unit from the non-ROI video data.

Figure 5:
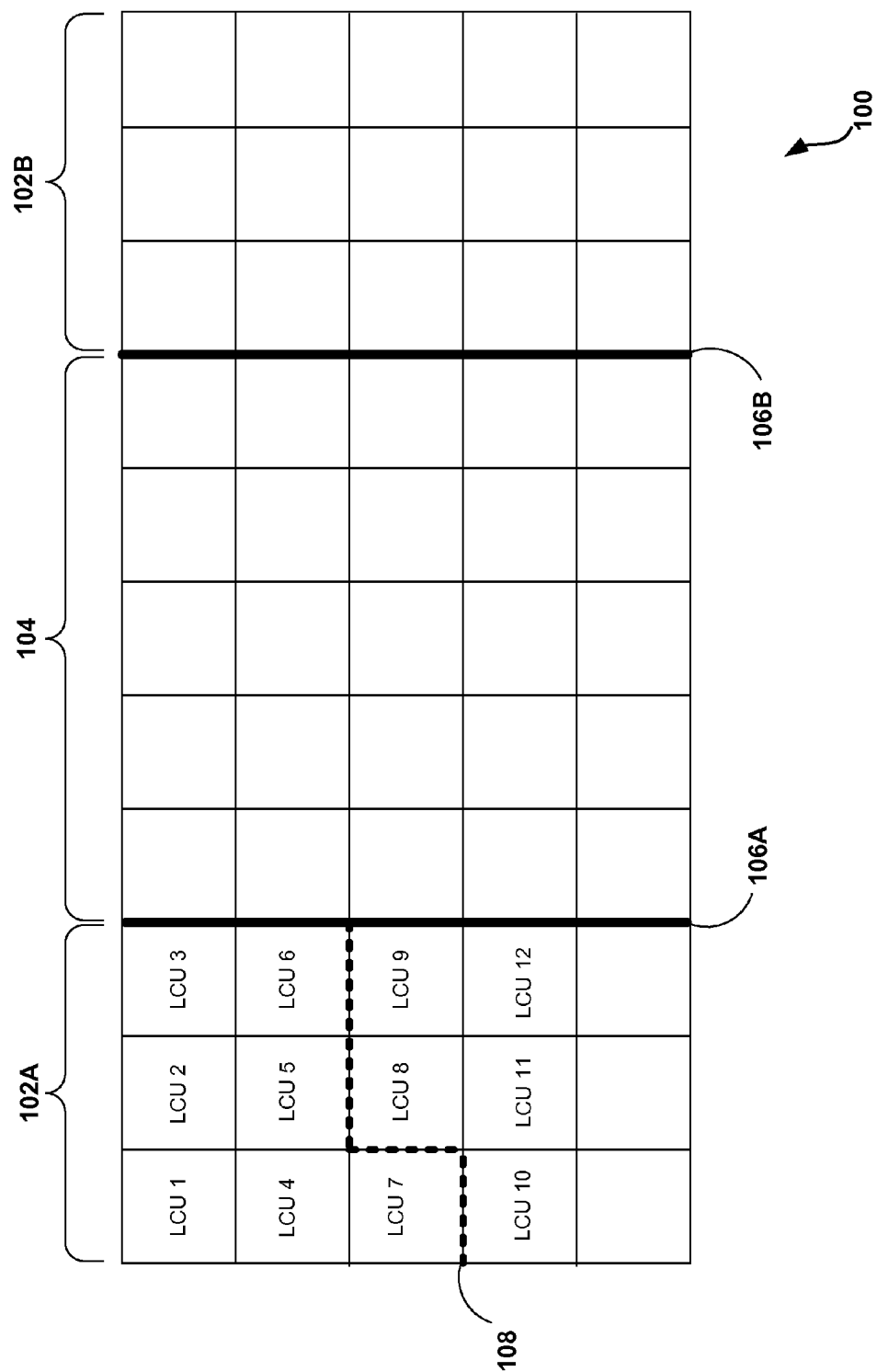
FIG. 5 is a conceptual diagram illustrating an example of partitioning of a picture by tile boundaries and a slice boundary.

FIG. 5 is a conceptual diagram illustrating an example of partitioning of a picture by tile boundaries and a slice boundary. In the example of FIG. 5, a picture 100 is partitioned into three vertical tiles 102A, 102B and 104 by two vertical tile boundaries 106A and 106B. Tiles 102A and 102B are a first tile group, and tile 104 is a second tile group. FIG. 5 also illustrates LCUs within the tiles, of which only LCUs 1-12 are labeled for ease of illustration.

As discussed above, the HM (like previous video coding standards) enables partitioning of pictures, i.e., frames, into slices, each of which consists of an integer number of LCUs in raster scan order. FIG. 5 illustrates an example slice boundary 108 between two slices of picture 100. As can be seen in FIG. 5, unlike tile boundaries 106, slice boundaries 108 are not necessarily vertical and/or horizontal lines across a picture, and slices are accordingly not necessarily rectangular.

A slice corresponds to a single NAL unit, and in-picture prediction is not permitted across slice boundaries. A slice (or NAL unit) may include more than one tile, or a tile may include more than once slice. In other words, there may be multiple slices within a tile, as illustrated with respect to the at least two slices within tile 102A. Furthermore, a slice may include LCUs from more than one tile, e.g., a NAL unit may include coded video data from more than one tile.

In some examples, the video data associated with tiles assigned to one tile group is placed in a common one or more slices or NAL units, and the video data associated with tiles assigned to another tile group is placed in a common one or more other slices or NAL units. Similarly, the video data associated with tiles assigned to one tile group may be placed in a common one or more packets, and the video data associated with tiles assigned to another tile group may be placed in a common one or more other packets. In some examples, placing the video data associated with tiles assigned to one tile group in a single slice, NAL unit, or packet may be preferred, if possible given the size of the tiles in the tile group relative to the allowed size of a slice, NAL unit, or packet. Packets, e.g., RTP packets, do not necessarily correspond to slices or NAL units, e.g., a plurality of packets may be needed for each NAL unit, or a plurality of NAL units may be included in a single packet. However, in some examples, video data associated with tiles assigned to a common tile group may be placed in a single common NAL unit (slice), which may then be included in a single common packet, or partitioned into a plurality of packets.

Such separation of video data associated with tiles assigned to different tile groups into different slices, NAL units, or packets may facilitate placing video data associated with tiles assigned to a common group consecutively in a bitstream, rather than placing the video data in the bitstream in raster scan order. Such separation may also facilitate ordering the video data associated with tiles assigned to different groups in an order based on the tile groups in a bitstream, which may facilitate preferential decoding of an independently decodable sub-picture or ROI by a video decoder. Such separation may also facilitate parallel processing of the video data for different tile groups, or error recovery, as described herein. Additionally, placing video data associated with tiles assigned to a common tile group within a common NAL unit or slice may facilitate limited in-picture prediction across tile boundaries, e.g., across tile boundaries within the tile group, but not between the tile groups, even when tiles of a common tile group are not adjacent in raster scan order.

Figure 6:
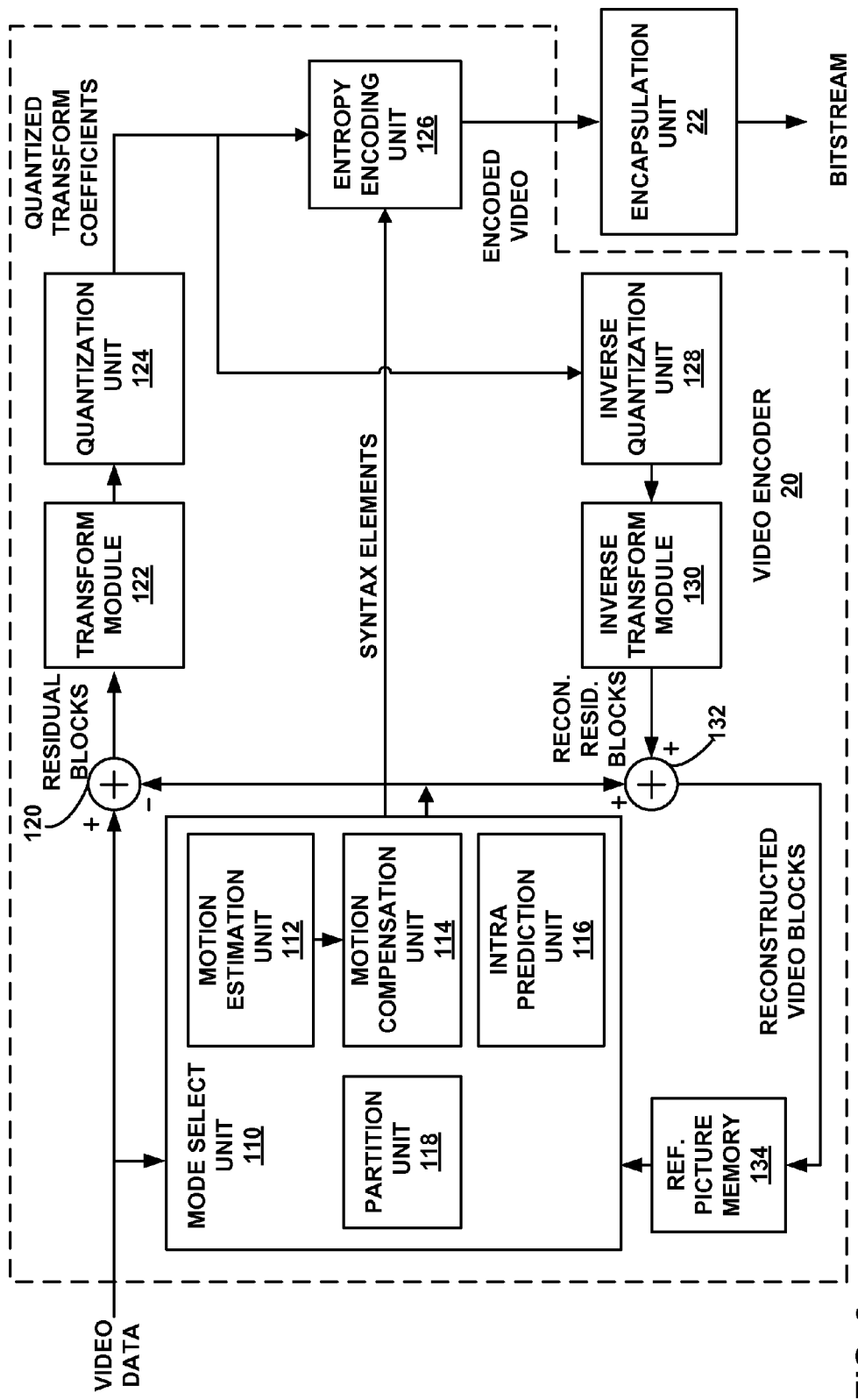
FIG. 6 is a block diagram illustrating an example video encoder in conjunction with an encapsulation unit.

FIG. 6 is a block diagram illustrating an example configuration of video encoder 20 in conjunction with encapsulation unit 22, which may implement the techniques for grouping tiles disclosed herein. The video encoder 20 will be described in the context of HEVC coding for purposes of illustration, but without limitation of this disclosure as to other coding standards or methods that may enable grouping of tiles. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 6, the video encoder 20 receives video data, e.g., a current video block within a picture to be encoded. In the example of FIG. 6, the video encoder 20 includes a mode select unit 110. Mode select unit 110 includes a motion estimation unit 112, a motion compensation unit 114, an intra-prediction unit 116, and a partition unit 118. Video encoder 20 further comprises a summer 120, a transform module 122, a quantization unit 124, and an entropy encoding unit 126. Transform module 122 illustrated in FIG. 6 is the unit that applies the actual transform or combinations of transform to a block of residual data, and is not to be confused with block of transform coefficients, which also may be referred to as a transform unit (TU) of a CU. For video block reconstruction, the video encoder 20 also includes an inverse quantization unit 128, an inverse transform module 130, and a summer 132. Reconstructed video blocks may be stored in a reference picture memory 134. A deblocking filter may also be included to filter block boundaries to remove blockiness artifacts from reconstructed video. If desired, the deblocking filter would typically filter the output of the summer 132.

During the encoding process, video encoder 20 receives a video frame or slice to be coded. The frame or slice may be divided into multiple video blocks. Motion estimation unit 112 and motion compensation unit 114 perform inter-predictive coding of the received video block relative to one or more blocks in one or more reference frames to provide temporal prediction. Intra-prediction unit 116 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 118 may partition blocks of video data into sub-blocks, based on evaluation of previous partitioning schemes in previous coding passes. For example, partition unit 118 may initially partition a frame or slice into LCUs, and partition each of the LCUs into sub-CUs based on rate-distortion analysis (e.g., rate-distortion optimization). Mode select unit 110 may further produce a quadtree data structure indicative of partitioning of an LCU into sub-CUs. Leaf-node CUs of the quadtree may include one or more PUs and one or more TUs. Partition unit may 118 also partition a frame or picture into slices other larger units. For example partition unit 118 may partition a picture into tiles in the manner described herein, e.g., by defining one or more horizontal and/or vertical tile boundaries, such that each tile is rectangular and includes an integer number of LCUs.

Whether temporal or spatial prediction is used to code the block, mode select unit 110 provides the resulting intra- or inter-predicted block (e.g., a prediction unit (PU)) to the summer 120 to generate residual block data and to the summer 132 to reconstruct the encoded block for use in a reference frame. Summer 132 combines the predicted block with inverse quantized, inverse transformed data from inverse transform module 130 for the block to reconstruct the encoded block, as described in greater detail below. Some video frames may be designated as I-frames, where all blocks in an I-frame are encoded in an intra-prediction mode. In some cases, the intra-prediction module 116 may perform intra-prediction encoding of a block in a P- or B-frame, e.g., when motion search performed by the motion estimation unit 112 does not result in a sufficient prediction of the block.

The motion estimation unit 112 and the motion compensation unit 114 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 112 calculates a motion vector for a prediction unit of an inter-coded frame by comparing the prediction unit to reference samples of a reference frame stored in the reference picture memory 134. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position. For example, video encoder 20 may interpolate values of one-quarter pixel positions, one-eighth pixel positions, or other fractional pixel positions of the reference picture. Therefore, motion estimation unit 112 may perform a motion search relative to the full pixel positions and fractional pixel positions and output a motion vector with fractional pixel precision.

The motion estimation unit 112 sends the calculated motion vector to the entropy encoding unit 126 and the motion compensation unit 114. The portion of the reference frame identified by a motion vector may be referred to as a reference sample. The motion compensation unit 114 may calculate a prediction value for a prediction unit of a current CU, e.g., by retrieving the reference sample identified by a motion vector for the PU.

The intra-prediction module 116 may intra-predict the received block, as an alternative to inter-prediction performed by the motion estimation unit 112 and the motion compensation unit 114. The intra-prediction module 116 may predict the received block relative to neighboring, previously coded blocks, e.g., blocks above, above and to the right, above and to the left, or to the left of the current block, assuming a left-to-right, top-to-bottom encoding order for blocks. The intra-prediction module 116 may be configured with a variety of different intra-prediction modes. For example, the intra-prediction module 116 may be configured with a certain number of directional prediction modes, e.g., thirty-five directional prediction modes, based on the size of the CU being encoded.

The intra-prediction module 116 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction module 116 may calculate an error value for the prediction mode based on pixel differences between the PU and the received block to be encoded. The intra-prediction module 116 may continue testing intra-prediction modes until an intra-prediction mode that yields an acceptable error value is discovered. The intra-prediction module 46 may then send the PU to the summer 120, and information indicative of the selected intra-prediction mode for the block to entropy encoding unit 116.

The video encoder 20 forms a residual block by subtracting the prediction data calculated by the motion compensation unit 114 or the intra-prediction module 116 from the original video block being coded. The summer 120 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform module 122 may form one or more transform units (TUs) from the residual block. The transform module 122 selects a transform from among a plurality of transforms. The transform may be selected based on one or more coding characteristics, such as block size, coding mode, or the like. The transform module 122 then applies the selected transform to the TU, producing a video block comprising a two-dimensional array of transform coefficients. The transform module 122 may signal the selected transform partition in the encoded video bitstream.

The transform module 122 may send the resulting transform coefficients to the quantization unit 124. The quantization unit 124 may then quantize the transform coefficients. The entropy encoding unit 126 may then perform a scan of the quantized transform coefficients in the matrix according to a scanning mode. This disclosure describes the entropy encoding unit 126 as performing the scan. However, it should be understood that, in other examples, other processing units, such as the quantization unit 124, could perform the scan.

Once the transform coefficients are scanned into the one-dimensional array, the entropy encoding unit 126 may apply entropy coding such as CAVLC, CABAC, syntax-based context-adaptive binary arithmetic coding (SBAC), or another entropy coding methodology to the coefficients.

To perform CAVLC, the entropy encoding unit 126 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, the entropy encoding unit 126 may select a context model to apply to a certain context to encode symbols to be transmitted. The context may relate to, for example, whether neighboring values are non-zero or not. The entropy encoding unit 126 may also entropy encode syntax elements, such as the signal representative of the selected transform. In accordance with the techniques of this disclosure, the entropy encoding unit 126 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 126, the resulting encoded video may be provided to encapsulation unit 22, and then transmitted to another device, such as the video decoder 34, or archived for later transmission or retrieval. Entropy encoding unit 126 may also receive and encode syntax elements, such as syntax elements that indicate the coding modes selected for blocks by mode select unit 110 and the partitioning of the video data for picture, e.g., into tiles and/or slices, by partition unit 118. Entropy encoding unit 126 provide the coded syntax elements to encapsulation unit 22, e.g., for transmission to another device, such as the video decoder 34, or archival for later transmission or retrieval.

In some cases, the entropy encoding unit 126 or another unit of the video encoder 20 may be configured to perform other coding functions, in addition to entropy coding. For example, the entropy encoding unit 126 may be configured to determine coded block pattern (CBP) values for CU's and PU's. Also, in some cases, the entropy encoding unit 126 may perform run length coding of coefficients.

The inverse quantization unit 128 and the inverse transform module 130 apply inverse quantization and inverse transformation, respectively, to reconstruct the residual block in the pixel domain, e.g., for later use as a reference block. The summer 132 adds the reconstructed residual block to the motion compensated prediction block produced by the motion compensation unit 114 to produce a reconstructed video block. In some examples, the reconstructed residual block may be filtered, e.g., by a de-blocking filter. After filtering, the filtered reconstructed video block is then stored in the reference picture memory 134. The motion compensation unit 114 may calculate a reference block by adding the residual block to a predictive block of one of the frames of the reference picture memory 134. The motion compensation unit 114 may also apply one or more interpolation filters to the reconstructed residual block to calculate sub-integer pixel values for use in motion estimation.

Encapsulation unit 22 receives the encoded video data and syntax elements from video encoder 20. Encapsulation unit 22 may group tiles, place the encoded video data associated with tile groups into NAL units, place the NAL units in packets, e.g., to place encoded data associated with different tile groups into different packets, and order encoded video data (packets) according to the techniques described herein. Encapsulation unit 22 may also include coded syntax elements, e.g., indicating how the video data was partitioned into tiles by partition unit 118 and how the tiles were grouped by encapsulation unit 22, into the bitstream.

Figure 7:
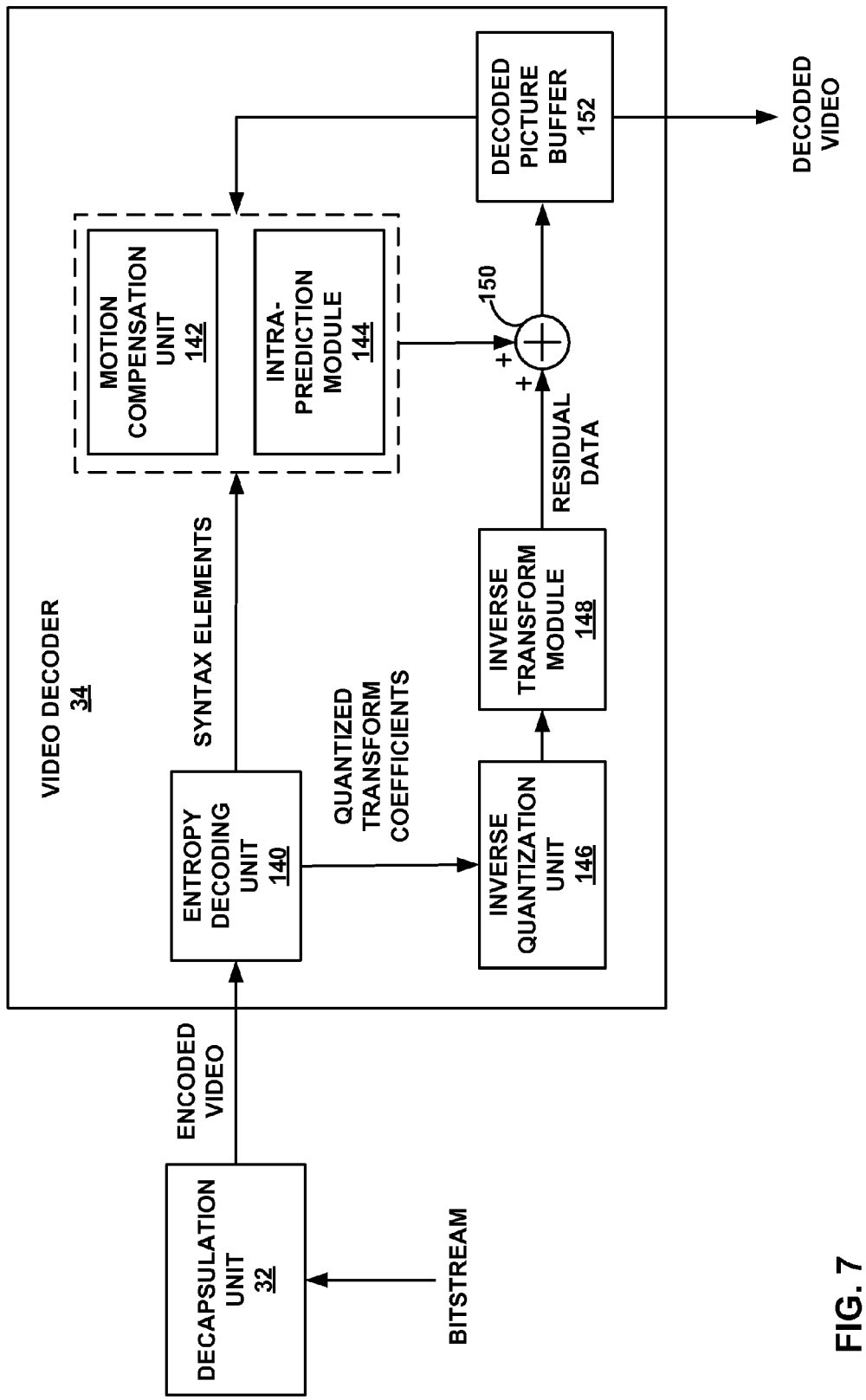
FIG. 7 is a block diagram illustrating an example video decoder in conjunction with an example decapsulation unit.

FIG. 7 is a block diagram illustrating an example configuration of video decoder 34 in conjunction with decapsulation unit 32. Decapsulation unit 32 receives the bitstream, including encoded video data and syntax elements, from encapsulation unit 22. Decapsulation unit 32 provides the encoded video data to video decoder 34 in accordance with the syntax elements. For example, in examples in which video decoder 34 comprises a plurality of parallel processing cores, decapsulation unit 32 may provide encoded video data associated with different tile groups to different ones of the parallel processing cores, e.g., hardware cores or threads. In examples in which video decoder 34 comprises a plurality of parallel processing cores, at least some or all of the components of the video decoder 34 illustrated in FIG. 7 may be repeated for each processing core. In some examples, some of the components of the video decoder 34 illustrated in FIG. 7 may be shared by different processing cores. As another example, decapsulation unit 32 may provide encoded video data associated with a tile group that covers an ROI to video decoder 34, and discard (or otherwise differentially provide to the video decoder) video data associated with one or more tile groups that do not cover the ROI.

In the example of FIG. 7, the video decoder 34 includes an entropy decoding unit 140, a motion compensation unit 142, an intra-prediction module 144, an inverse quantization unit 146, an inverse transformation unit 148, a decoded picture buffer 152, and a summer 150. The video decoder 34 may, in some examples, perform a decoding pass generally reciprocal to the encoding pass described with respect to the video encoder 20 (see FIG. 6). Motion compensation unit 142 may generate prediction data based on motion vectors received from entropy decoding unit 140, while intra-prediction unit 144 may generate prediction data based on intra-prediction mode indicators received from entropy decoding unit 140.

During the decoding process, video decoder 34 receives an encoded video bitstream that represents video blocks of an encoded video slice and associated syntax elements from video encoder 20. The entropy decoding unit 140 performs an entropy decoding process on the encoded bitstream to retrieve a one-dimensional array of transform coefficients, motion vectors or intra-prediction mode indicators, and other syntax elements. Entropy decoding unit 140 forwards the transform coefficients, motion vectors or intra-prediction mode indicators, and other syntax elements to motion compensation unit 142 or intra-prediction module 144. The entropy decoding process used depends on the entropy coding used by the video encoder 20 (e.g., CABAC, CAVLC, etc.). The entropy coding process used by the encoder may be signaled in the encoded bitstream or may be a predetermined process.

In some examples, the entropy decoding unit 140 (or the inverse quantization unit 146) may scan the received values using a scan mirroring the scanning mode used by the entropy encoding unit 126 (or the quantization unit 124) of the video encoder 20. Although the scanning of coefficients may be performed in the inverse quantization unit 146, scanning will be described for purposes of illustration as being performed by the entropy decoding unit 140. In addition, although shown as separate functional units for ease of illustration, the structure and functionality of the entropy decoding unit 140, the inverse quantization unit 146, and other units of the video decoder 34 may be highly integrated with one another.

The inverse quantization unit 146 inverse quantizes, i.e., de-quantizes, the quantized transform coefficients provided in the bitstream and decoded by the entropy decoding unit 140. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 146 may inverse quantize the transform coefficients either before or after the coefficients are converted from a one-dimensional array to a two-dimensional array.

The inverse transform module 148 applies an inverse transform to the inverse quantized transform coefficients. In some examples, the inverse transform module 148 may determine an inverse transform based on signaling from the video encoder 20, or by inferring the transform from one or more coding characteristics such as block size, coding mode, or the like. In some examples, the inverse transform module 148 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform module 148 may apply a cascaded inverse transform, in which inverse transform module 148 applies two or more inverse transforms to the transform coefficients of the current block being decoded.

When the video slice is coded as an intra-coded (I) slice, intra prediction unit 144 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 142 produces predictive blocks for a video block of the current video slice based on the motion vectors and other syntax elements received from entropy decoding unit 140. Motion compensation unit 142 determines prediction information for a video block of the current video slice by parsing the motion vectors and other syntax elements, and uses the prediction information to produce the predictive blocks for the current video block being decoded. For example, motion compensation unit 142 may use some of the received syntax elements to determine a prediction mode (e.g., intra- or inter-prediction) used to code the video blocks of the video slice, an inter-prediction slice type (e.g., B slice, P slice, or GPB slice), motion vectors for each inter-encoded video block of the slice, inter-prediction status for each inter-coded video block of the slice, and other information to decode the video blocks in the current video slice.

Motion compensation unit 142 may also perform interpolation based on interpolation filters. Motion compensation unit 142 may use interpolation filters as used by video encoder 20 during encoding of the video blocks to calculate interpolated values for sub-integer pixels of reference blocks. In this case, motion compensation unit 142 may determine the interpolation filters used by video encoder 20 from the received syntax elements and use the interpolation filters to produce predictive blocks.

Additionally, the motion compensation unit 142 and the intra-prediction module 144, in an HEVC example, may use some of the syntax information (e.g., provided by a quadtree) to determine sizes of LCUs used to encode frame(s) of the encoded video sequence, as well as how the LCUs were partitioned into tiles. The motion compensation unit 142 and the intra-prediction module 144 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

After generation of the predictive block for the current video block, video decoder 34 forms a decoded video block by summing the residual blocks from inverse transform unit 148 with the corresponding predictive blocks. Summer 150 represents the component or components that perform this summation operation. The decoded video blocks in a given frame or picture are then stored in reference picture memory 152, which stores reference pictures used for subsequent decoding operations. Decoded picture buffer 152 also stores decoded video for later presentation on a display device, such as display device 36 of FIG. 1.

In examples in which video decoder 34 comprises a plurality of parallel processing cores, at least some or all of the components of the video decoder 34 illustrated in FIG. 7 may be repeated for each processing core, or may be shared by different processing cores. For example, any of entropy decoding unit 140, motion compensation unit 142, intra-prediction module 144, inverse quantization unit 146, inverse transformation unit 148, decoded picture buffer 152, and summer 150 may be repeated for each processing core, or shared by the processing cores. Furthermore, the various functions associated herein with each of decoding unit 140, motion compensation unit 142, intra-prediction module 144, inverse quantization unit 146, inverse transformation unit 148, decoded picture buffer 152, and summer 150 may be performed in parallel for video data associated with tiles assigned to different groups. Parallel processing may include coding at least some portion of the video data associated with tiles assigned to different groups by respective processing cores at substantially the same time. For parallel processing, the processing cores could, but do not necessarily start or end coding video data of the picture at the same time. However, during at least a portion of the parallel processing, the cores are coding simultaneously.

Figure 8:
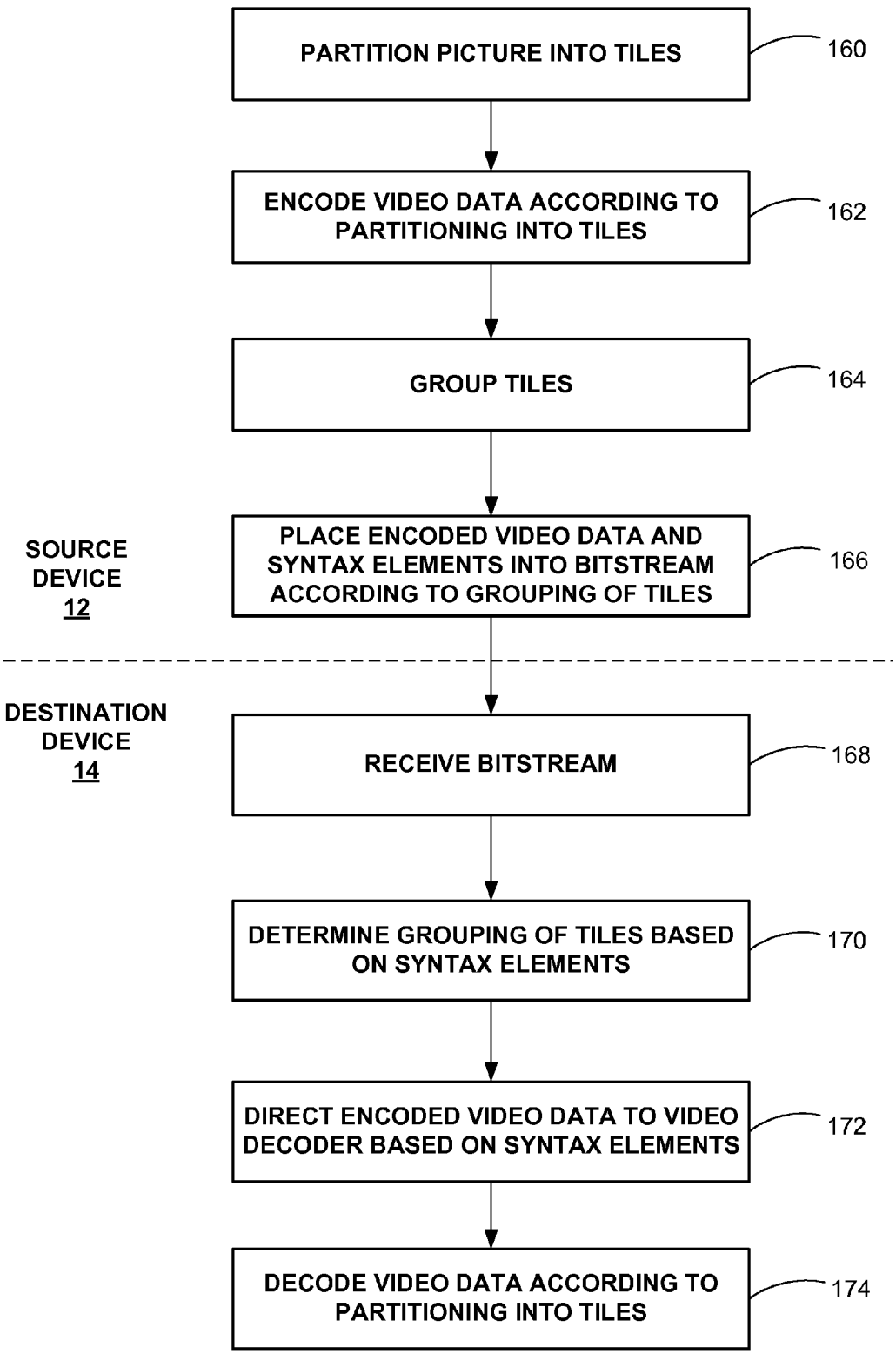
FIG. 8 is a flowchart depicting an example method that includes grouping of tiles according to this disclosure.

FIG. 8 is flowchart depicting an example method that includes grouping tiles according to the disclosure. The example method of FIG. 8 is illustrated as being performed by source device 12 and destination device 14. However, the various functions attributed to source device 12 and destination device 14 and, more particularly, the example components of these devices described herein may be performed by any other device, module or unit described herein.

According to the example method, source device 12 (e.g., video encoder 20 and, more particularly, partition unit 118 may partition a picture into tiles (160). For example, partition unit 118 may partition the picture into tiles by defining one or more vertical and/or horizontal tile boundaries within the picture. The resulting tiles may be rectangular and include an integer number of LCUs.

Partition unit 118 may also partition the picture into slices, which have one-to-one correspondence with NAL units. Depending on the size of the tiles, each tile may include a plurality of slices (or NAL units), or a plurality of tiles may be included in one slice (or NAL unit). Source device 12 (e.g., video encoder 20) may then encode the video data according to the partitioning of the picture into tiles and slices (162). For example, source device 12 (e.g., video encoder 20) may, in some examples, not allow in-picture prediction across the tile boundaries.

In some examples, source device 12 may allow limited in-picture prediction across tile boundaries, e.g., based upon the assignment of tiles to tile groups. For example, mode select unit 110 may, in some examples, disallow in-picture prediction from a region covered by a tile group to a region not covered by the tile group, while allowing in-picture prediction from a region not covered by the tile group to the region covered by the tile group. In other examples, mode select unit 110 may allow in-picture prediction from a region covered by a tile group to a region not covered by the tile group, while disallowing in-picture prediction from a region not covered by tile group to the region covered by the tile group.

Source device 12 (e.g., encapsulation unit 22) may group the tiles, e.g., assign each of the tiles to one of a plurality of tile groups (164). Source device 12 (e.g., encapsulation unit 22) may then place the encoded video data and syntax elements into a bitstream according to the grouping of tiles (166). Syntax elements in the bitstream may include syntax that indicates how the picture was partitioned into tiles, as well as syntax that indicates how the tiles were assigned to groups. Example syntax elements that may be used for these purposes are described in greater detail below. Source device 12 may place the encoded video data into the bitstream according to the grouping of tiles by placing video data into different packets based upon to which tile group the tile associated with the video data was assigned, or placing the video data into the bitstream in an order that is based upon tile groups.

In some examples, source device 12 may place the video data associated with tiles assigned to one tile group in a common one or more slices or NAL units, and place the video data associated with tiles assigned to another tile group in a common one or more other slices or NAL units. Similarly, source device 12 may place the video data associated with tiles assigned to one tile group in a common one or more packets, and place the video data associated with tiles assigned to another tile group in a common one or more other packets. In some examples, placing the video data associated with tiles assigned to one tile group in a single slice, NAL unit, or packet may be preferred, if possible given the size of the tiles in the tile group relative to the allowed size of a slice, NAL unit, or packet.

Such separation of video data associated with tiles assigned to different tile groups into different slices, NAL units, or packets may facilitate placing video data associated with tiles assigned to a common group consecutively in a bitstream, rather than placing the video data in the bitstream in raster scan order. Such separation may also facilitate ordering the video data associated with tiles assigned to different groups in an order based on the tile groups in a bitstream, which may facilitate preferential decoding of an independently decodable sub-picture or ROI by a video decoder. Such separation may also facilitate parallel processing of the video data for different tile groups, or error recovery, as described herein. Additionally, placing video data associated with tiles assigned to a common tile group within a common NAL unit or slice may facilitate limited in-picture prediction across tile boundaries, e.g., across tile boundaries within the tile group, but not between the tile groups, even when tiles of a common tile group are not adjacent in raster scan order.

Packets, e.g., RTP packets, do not necessarily correspond to slices or NAL units, e.g., a plurality of packets may be needed for each NAL unit, or a plurality of NAL units may be included in a single packet. However, in some examples, video data associated with tiles assigned to a common tile group may be placed in a single common NAL unit (slice), which may then be included in a single common packet, or partitioned into a plurality of packets.

Destination device 14 (e.g., decapsulation unit 32) receives the bitstream (168). In some examples, the receipt of the bitstream by destination device 14 is through the source device 12 and destination device 14 communicating with each other. In various examples, destination device 14 may receive the bitstream generated by source device at some time after the generation via for example, a server 37 or medium 36, as discussed above.

After receipt of the bitstream, destination device 14 (e.g., decapsulation unit 32) may determine the grouping of tiles based on syntax elements in the bitstream that indicate how the tiles of a picture have been grouped (170). Example syntax elements for this purpose are described in greater detail below.

Destination device 14 (e.g., decapsulation unit 32) directs the encoded video data to video decoder 34 based on the syntax elements indicating the grouping of tiles (172). For example, in examples in which video decoder 34 comprises a plurality of parallel processing cores, decapsulation unit 32 may provide encoded video data associated with different tile groups to different ones of the parallel processing cores. As another example, decapsulation unit 32 may provide encoded video data associated with a tile group that covers an ROI to video decoder 34, and discard (or otherwise differentially provide to the video decoder) video data associated with one or more tile groups that do not cover the ROI. Destination device 14 (e.g., video decoder 34) decodes the video data according to the partitioning of the picture into tiles (174). For example, destination device 14 (e.g., video decoder 34) may decode the video data according to whether intra-prediction was allowed across tile boundaries, across tile boundaries only within tile groups, from outside of a tile group to within the tile group, or from within a tile group to outside of a tile group. As another example, destination device 14 (e.g., video decoder 34) may decode the video data in an order established by the grouping of tiles. In one example, the decoding order is from the tile group with the smallest tile group ID to the largest tile group ID, while in another the decoding order is from largest tile group ID to smallest. Tile group ID is an example syntax element discussed in greater detail below. In some examples, the decoding order for tile groups is explicitly signaled in the coded video bitstream, e.g., by encapsulation unit 22.

Examples of syntax, semantics and coding for the tile grouping techniques described herein are now provided (for those syntax elements that are not removed and that no semantics are provided, their semantics may be the same as or similar to the pertinent syntax and semantics presented in JCTVC-F335). In some examples, each tile in a picture is associated with a tile ID, which is equal to the index to the list of all tiles in the picture in tile raster scan order, starting from 0 (for the top-left tile). Tiles are assigned to one or more tile groups, identified by unsigned integer tile group ID values starting from 0. In some examples, tiles are decoded in order according to the tile group ID value, e.g., from smallest to largest tile group ID value.

An example of syntax information that may be included in a sequence parameter set (SPS) and picture parameter set (PPS), including syntax for indicating how tiles are grouped, is as follows.

| seq_parameter_set_rbsp( ) { | Descriptor |
|---|---|
|     profile_idc | u(8) |
|     reserved_zero_8bits /* equal to 0 */ | u(8) |
|     level_idc | u(8) |
|     seq_parameter_set_id | ue(v) |
|     pic_width_in_luma_samples | u(16) |
|     pic_height_in_luma_samples | u(16) |
|     bit_depth_luma_minus8 | ue(v) |
|     bit_depth_chroma_minus8 | ue(v) |
|     bit_depth_luma_increment | ue(v) |
|     bit_depth_chroma_increment | ue(v) |
|     log2_max_frame_num_minus4 | ue(v) |
|     pic_order_cnt_type | ue(v) |
|     if( pic_order_cnt_type = = 0 ) | |
|         log2_max_pic_order_cnt_lsb_minus4 | ue(v) |
|     else if( pic_order_cnt_type = = 1 ) { | |
|         delta_pic_order_always_zero_flag | u(1) |
|         offset_for_non_ref_pic | se(v) |
|         num_ref_frames_in_pic_order_cnt_cycle | ue(v) |
|         for( i = 0; i<num_ref_frames_in_pic_order_cnt_cycle; i++ ) | |
|             offset_for_ref_frame[ i ] | se(v) |
|     } | |
|     max_num_ref_frames | ue(v) |
|     gaps_in_frame_num_value_allowed_flag | u(1) |
|     log2_min_coding_block_size_minus3 | ue(v) |
|     log2_diff_max_min_coding_block_size | ue(v) |
|     log2_min_transform_block_size_minus2 | ue(v) |
|     log2_diff_max_min_transform_block_size | ue(v) |
|     max_transform_hierarchy_depth_inter | ue(v) |
|     max_transform_hierarchy_depth_intra | ue(v) |
|     interpolation_filter_flag | u(1) |
|     num_tile_columns_minus1 | ue(v) |
|     num_tile_rows_minus1 | ue(v) |
|     if (num_tile_columns_minus1 !=0 \|\| num_tile_rows_minus1 != 0) { | |
|         tile_boundary_independence_idc | u(1) |
|         uniform_spacing_idc | u(1) |
|         tile_group_type | ue(v) |
|         if (uniform_spacing_idc != 1) { | |
|             for (i=0; i<num_tile_columns_minus1 ; i++) | |
|                 column_width[i] | ue(v) |
|             for (i=0; i <num_tile_rows_minus1; i++) | |
|                 row_height[i] | ue(v) |
|         } | |
|         if( tile_group_type >= 1 && tile_group_type <= 5 ) { | |
|             num_tile_groups_minus2 | ue(v) |
|         if( tile_group_type = = 3 ) | |
|             for( i = 0; i < num_tile_groups_minus2 + 1; i++ ) { | |
|                 top_left[ i ] | ue(v) |
|                 bottom_right[ i ] | ue(v) |
|             } | |
|         else if( tile_group_type = = 4 && tile_group_type = = 5 ) { | |
|             NumTiles = ( num_tile_columns_minus1 + 1 ) * ( num_tile_rows_minus1 + 1 ) | |
|             for( i = 0, j = 0; j < NumTiles; i++ ) { | |
|                 tile_group_id[ i ] | ue(v) |
|                 run_length_minus1[i] | ue(v) |
|                 j += run_length_minus1[ i ] | |
|             } | |
|         } | |
|     } | |
|     rbsp_trailing_bits( ) | |
| } | |

| pic_parameter_set_rbsp( ) { | Descriptor |
|---|---|
|     pic_parameter_set_id | ue(v) |
|     seq_parameter_set_id | ue(v) |
|     entropy_coding_mode_flag | u(1) |
|     num_ref_idx_l0_default_active_minus1 | ue(v) |
|     num_ref_idx_l1_default_active_minus1 | ue(v) |
|     pic_init_qp_minus26/* relative to 26 */ | se(v) |
|     constrained_intra_pred_flag | u(1) |
|     tile_info_present_flag | u(1) |
|     if (tile_info_present_flag == 1) { | |
|         num_tile_columns_minus1 | ue(v) |
|         num_tile_rows_minus1 | ue(v) |
|         if (num_tile_columns_minus1 !=0 \|\| num_tile_rows_minus1 != 0) { | |
|             tile_boundary_independence_idc | u(1) |
|             uniform_spacing_idc | u(1) |
|             tile_group_type | ue(v) |
|             if (uniform_spacing_idc != 1) { | |

```
                    for (i=0; i<num_tile_columns_minus1 ; i++)
                        column_width[i]                                                 ue(v)
                    for (i=0; i <num_tile_rows_minus1; i++)
                        row_height[i]                                                   ue(v)
                }
                if( tile_group_type >= 1 && tile_group_type <= 5 ) {
                    num_tile_groups_minus2                                              ue(v)
                    if( tile_group_type = = 3 )
                        for( i = 0; i < num_tile_groups_minus2 + 1; i++ ) {
                            top_left[ i ]                                               ue(v)
                            bottom_right[ i ]                                           ue(v)
                        }
                    else if( tile_group_type = = 4 && tile_group_type = = 5 ) {
                        NumTiles = (num_tile_columns_minus1 + 1) * (num_tile_rows_minus1 + 1)
                        for( i = 0, j = 0; j < NumTiles; i++ ) {
                            tile_group_id[ i ]                                          u(v)
                            run_length_minus1[ i ]                                      ue(v)
                            j += run_length_minus1[ i ]
                        }
                    }
                }
            }
        rbsp_trailing_bits( )
    }
```

The syntax element tile_group_type specifies how the mapping of tiles to tile groups is coded. The value of tile_group_type may be in the range of 0 to 6, inclusive.

Tile_group_type equal to 0 specifies that all tiles belong to one tile group, with the tile group identifier TileGroupId equal to 0. The number of tile groups, represented by the variable NumTileGroups, is derived as equal to 1.

Tile_group_type equal to 1 specifies that each column of tiles belongs to one tile group, and the tile group identifier TileGroupId is equal to 0 for the left-most column of tiles, and increases by 1 for each column of tiles from left to right. Tile_group_type equal to 2 specifies that each row of tiles belongs to one tile group, and the tile group identifier TileGroupId is equal to 0 for the top row of tiles, and increases by 1 for each row of tiles from top to bottom. For both tile tile_group_type equal to 1 and tile_group_type equal to 2, the number of tile groups, represented by the variable NumTileGroups, is derived as equal to num_tile_groups_minus2+2.

Tile_group_type equal to 3 specifies one or more "foreground" tile groups and one or more "leftover" tile groups. The one or more "foreground" tile groups may correspond to an independently codable sub-picture, or ROI, as discussed above. The number of tile groups, represented by the variable NumTileGroups, is derived as equal to num_tile_groups_minus2+2.

Tile_group_type value equal to 4 or 5 specifies explicit assignment of a tile to each tile group, coded in compact manner. The number of tile groups, represented by the variable NumTileGroups, is derived as equal to num_tile_groups_minus2+2.

Tile_group_type value equal to 6 specifies a checkerboard like assignment of tiles to two tile groups. The number of tile groups, represented by the variable NumTileGroups, is derived as equal to 2. The top-left tile is assigned to tile group 0. For any tile of tile group 0, a neighboring tile to the left, right, upper or lower, if present, is assigned to tile group 1. For any tile of tile group 1, a neighboring tile to the left, right, upper or lower, if present, is assigned to tile group 0.

num_tiles_groups_minus2 plus 2 specifies the number of tile groups for a picture. This syntax element is only present when tile_group_type is in the range of 1 to 5, inclusive. The value of this syntax element shall be in the range of 0 to 16, inclusive.

top_left[i] and bottom_right[i] specify the top-left and bottom-right corners of a rectangle, respectively. Top_left[i] and bottom_right[i] are tile positions in the picture in tile raster scan order. For each rectangle i, all of the following constraints shall be obeyed by the values of the syntax elements top_left[i] and bottom_right[i]:
  top_left[i] shall be less than or equal to bottom_right[i] and bottom_right[i] shall be less than NumTiles that is equal to (num_tile_columns_minus1+1)*(num_tile_rows_minus1+1).
  (top_left[i] % num_tile_columns_minus1+1) shall be less than or equal to the value of (bottom_right[i] % num_tile_columns_minus1+1).

The rectangles may overlap. Tile group 0 contains the tiles that are within the rectangle specified by top_left[0] and bottom_right[0]. A tile group having tile group ID greater than 0 and less than NumTileGroups−1 contains the tiles that are within the specified rectangle for that tile group that are not within the rectangle specified for any tile group having a smaller tile group ID. The tile group with tile group ID equal to NumTileGroups−1 contains the tiles that are not in any other tile group.

tile_group_id[i] identifies a tile group. The length of the tile_group_id[i] syntax element is Ceil(Log2(num_tile_groups_minus2+2)) bits. The value of tile_group_id[i] shall be in the range of 0 to num_tile_groups_minus2+2, inclusive.

run_length_minus1[i] is used to specify the number of consecutive tiles to be assigned to the i-th the group in tile raster scan order. The value of run_length_minus1[i] shall be in the range of 0 to NumTiles−1, inclusive.

At the start of each slice, decapsulation unit 32 may create a tile to tile group map (TileGroupMap) based on the syntax provided by the active SPS and PPS. TileGroupMap may comprise NumTiles values, each corresponding to the tile group ID value of one tile, indexed in tile raster scan order. TileGroupMap is the same for all slices of a picture.

Example pseudocode, representative of operations within encoder 20 or decoder 34, for deriving the tile to tile group map (TileGroupMap) is as follows:

```
numRows = num_tiles_rows_minus1 + 1
numCols = num_tiles_columns_minus1 + 1
if( tile_group_type = = 0)
    for( i = 0; i < NumTiles; i++ )
        TileGroupMap[ i ] = 0
else if(tile_group_type = = 1)
    for( y = 0; y < numRows ; y++ )
        for( x = 0; x < numCols; x++ )
            TileGroupMap[ y * numCols + x ] = x % NumTileGroups
else if(tile_group_type = = 2)
    for( y = 0; y < numRows; y++ )
        for( x = 0; x < numCols; x++ )
            TileGroupMap[ y * numCols + x ] = y % NumTileGroups
else if(tile_group_type = = 3) {
    for( i = 0; i = NumTiles − 1; i++ )
        TileGroupMap[ i ] = NumTileGroups − 1
    for( i = NumTileGroups − 2; i >= 0; i− − ) {
        yTopLeft = top_left[ i ] / numCols
        xTopLeft = top_left[ i ] % numCols
        yBottomRight = bottom_right[ i ] / numCols
        xBottomRight = bottom_right[ i ] % numCols
        for( y = yTopLeft; y <= yBottomRight; y++ )
            for( x = xTopLeft; x <= xBottomRight; x++ )
                TileGroupMap[ y * numCols + x ] = i
    }
}
else if( tile_group_type = = 4 | | tile_group_type = = 5 ) {
    for( i = 0, j = 0; j < NumTiles; i++ )
        for( k = 0; k < run_length_minus1[ i ]; k++, j++ )
            tileGroupMap[ j ] = tile_group_id[ i ]
    if( tile_group_type = = 4 )
        for( i = 0; i < NumTiles; i++ ) {
            y = i / numCols
            x = i % numCols
            TileGroupMap[ i ] = tileGroupMap[ x * numRows + y ]
        }
    else  // tile_group_type = = 5
        for( i = 0; i < NumTiles; i++ )
            TileGroupMap[ i ] = tileGroupMap[ i ]
}
else  // tile_group_type = = 6
    for( y = 0; y < numRows − 1; y++ )
        for( x = 0; x < numCols − 1; x++ )
            TileGroupMap[ y * numCols + x ] = (y % 2 ) ? (x+1) % 2 :
                x % 2
```

Pseudocode for an example process to determine the tile ID of the next tile (NextTileId) based on the tile ID of the current tile (currTileId) is as follows.

```
tgId = TileGroupMap[ currTileId ]
for( i = currTileId + 1; i < NumTiles; i++ )
    if( TileGroupMap[ i ] = = tgId) {
        NextTileId = i;
        return;
    }
for ( j = currTileId + 1; j< NumTiles; j++ )
    if ( tgId+1 = = TileGroupMap[ j ]) {
        NextTileId = j;
        return;
    }
NextTileId = −1
// If still not returned here, then the current tile is the last tile of the picture
in decoding order,
// i.e., the last tile of the tile group with the greatest tile group ID.
```

Pseudocode for an example process to determine the accumulative tile width and height is as follows.

```
acc_columnwidth[0] = 0
for (i =1; i <= num_tile_columns_minus1; i++)
    acc_columnwidth[i] = acc_columnwidth[i−1]+ column_width[i−1]
acc_columnwidth[num_tile_columns_minus1+1] = picWidthInLCUs;
column_width[num_tile_columns_minus1+1] = picWidthInLCUs−
    acc_columnwidth[i]
acc_rowheight [0] = 0
for (i =1; i <= num_tile_rows_minus1 ; i++)
    acc_rowheight[i] = acc_rowheight[i−1]+ row_height[i−1]
acc_rowheight[num_tile_rows_minus1 +1] = picHeightInLCUs;
row_height[num_tile_rows_minus +1] = picHeightInLCUs−
    acc_rowheight[i]
```

Pseudocode for an example processor in encoder 20 or decoder 34 to determine the address of the next LCU (nextLCUAddr) and the tile ID of the tile to which the next LCU belongs (updateTileId) based on the address of the current LCU (currLCUAddr) and the tile ID of the tile to which the current LCU belongs(TileId) is as follows.

```
TileCol = TileId% (num_tile_columns_minus1+1)
TileRow = TileId/( num_tile_columns_minus1+1)
CUSize = 1<<(1+ log2MaxCUSize)
LCUX = (currLCUAddr>>(1+ log2MaxCUSize))% picWidthInLCUs
LCUY = (currLCUAddr>>(1+ log2MaxCUSize))/ picWidthInLCUs
updateTileId = TileId
if (LCUX+1 < acc_columnwidth[TileCol+1] )
    nextLCUAddr = currLCUAddr + CUSize
else if (LCUCol+1 < acc_rowheight[TileRow+1] )
    nextLCUAddr = currLCUAddr + CUSize*(picWidthInLCUs −
        column_width[TileCol]+1)
else {
    updateTileId = NextTileAddr[TileId]
    NewTileCol = updateTileId % (num_tile_columns_minus1+1)
    NewTile Row = updateTileId /( num_tile_columns_minus1+1)
    LCUNum = (acc_rowheight[NewTileRow])*picWidthInLCUs +
acc_columnwidth[NewTileCol]
    nextLCUAddr = LCUNum*CUSize
}
Where NextTileAddr[ tileId ] is the value of NextTileAddr derived for the
tile with tile ID equal to tileId.
```

In the above example, information indicative of group IDs is signaled in both the SPS and PPS. In other examples, such information is signaled in only one of the SPS or PPS, or within an adaptation parameter set (APS) or slice header. The concept of an APS is described in JCTVC-F747, available from http://phenix.int-evry.fr/jct/doc_end_user/documents/6_Torino/wg11/JCTVC-F747-v4.zip. Furthermore, in some examples a dynamic grouping style is signaled in an SPS, PPS or APS. A dynamic grouping style may refer to the grouping of tiles changing across pictures. For example, the number of tiles may remain equal to two from picture-to-picture, but the number of LCUs covered by a tile group may increase from one picture to the next picture in output order.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data and syntax information from a bitstream, wherein the video data comprises a picture, the method comprising:
    determining a partitioning, indicated by the syntax information, of the picture into a plurality of largest coding units (LCUs);
    determining a partitioning of the picture into a plurality of rectangular tiles by one or more tile boundaries indicated by the syntax information, wherein each of the tile boundaries is a horizontal or vertical line across the picture, and wherein each of the plurality of LCUs is within one of the plurality of rectangular tiles and each of the rectangular tiles comprises a respective subset of the plurality of the LCUs;
    determining a partitioning, indicated by the syntax information, of the picture into a plurality of slices by one or more slice boundaries, wherein the slice boundaries are not constrained to be the same as the tile boundaries, and wherein each of the plurality of LCUs is within one of the plurality of slices and each of the slices comprises a respective subset of the plurality of the LCUs;
    decoding, from the bitstream, syntax information that indicates one of a plurality of tile groups to which each of the plurality of tiles is assigned,
    wherein the video data comprises first video data of a first tile group of the plurality of tile groups and second video data of a second tile group of the plurality of tile groups, and
    wherein the first video data and the second video data are separately included in at least one of: a first one or more NAL units and a second one or more NAL units, a first one or more of the plurality of slices and a second one or more of the plurality of slices, or a first one or more packets and a second one or more packets; and
    reconstructing the picture, using at least one of the first video data or the second video data, based on the determined partitioning of the picture into the plurality of LCUs, the determined partitioning of the picture into the plurality of tiles, the determined partitioning of the picture into the plurality of slices, and the information that indicates the one of the plurality of tile groups to which each of the plurality of tiles is assigned.

2. The method of claim 1, wherein the syntax information that indicates the one of the plurality of tile groups to which each of the plurality of tiles is assigned comprises, for each of the plurality of tiles of the picture, a selected one of a plurality of tile group IDs associated with the tile, wherein the selected tile group ID indicates to which of the tile groups the tile is assigned.

3. The method of claim 1, wherein the tiles assigned to the first tile group are interleaved within the picture with the tiles assigned to the second tile group.

4. The method of claim 1, wherein a subset of the plurality of tile groups forms at least one of an independently decodable sub-picture or a region of interest (ROI).

5. The method of claim 4, further comprising at least one of:
    requesting non-delivery of a portion of the video data that is not associated with the subset of tile groups, or
    discarding the portion of the video data that is not associated with the subset of tile groups.

6. The method of claim 1, wherein the tiles from the first and second tile groups are alternated within the picture to form a checkerboard pattern.

7. The method of claim 1, further comprising:
    decoding the first video data of the first tile group with a first parallel processing core of a video decoder; and
    decoding the second video data of the second tile group with a second parallel processing core of the video decoder.

8. The method of claim 1, wherein reconstructing the picture comprises reconstructing lost first video data of the first tile group based on the second video data of the second tile group.

9. The method of claim 1, wherein the video data is ordered within the bitstream according to the tile groups.

10. The method of claim 1, further comprising decoding the video data in an order based on the tile groups.

11. The method of claim 10,
wherein the syntax information that indicates the one of the plurality of tile groups to which each of the plurality of tiles is assigned comprises, for each of the plurality of tiles of the picture, a selected one of a plurality of tile group IDs associated with the tile,
wherein the selected tile group ID indicates to which of the plurality of tile groups the tile is assigned, and
wherein decoding the video data in an order based on the tile groups comprises decoding the video data in an order based on numerical values of the tile group IDs for the tiles.

12. The method of claim 1, further comprising:
allowing in-picture prediction across tile boundaries for tiles within a common tile group; and
disallowing in-picture prediction across tile boundaries for tiles within different tile groups.

13. The method of claim 1, wherein decoding, from the bitstream, the information that indicates the one of the plurality of tile groups to which each of the plurality of tiles is assigned comprises decoding the syntax information from at least one of a sequence parameter set (SPS), picture parameter set (PPS), or adaptation parameter set (APS).

14. The method of claim 1, wherein the slice boundaries are different than the tile boundaries.

15. The method of claim 1,
wherein the video data is ordered within the bitstream according to the tile groups such that video data of tiles in the same tile group is presented consecutively in the bitstream, and video data of tiles in one of the plurality of tile groups is presented in the bitstream before video data of tiles in another of the plurality of tile groups, and
wherein the method further comprises directing the video data of tiles of different ones of the plurality of tile groups to different parallel processing cores of a video decoder for decoding different tile groups in parallel with one another.

16. A device for coding video data comprising:
a memory configured to store the video data; and
one or more processors configured to code the video data and syntax information in a bitstream, wherein the video data comprises a picture, and wherein the one or more processors are configured to:
determine a partitioning, indicated by the syntax information, of the picture into largest coding units (LCUs),
determine a partitioning of the picture into a plurality of rectangular tiles by one or more tile boundaries indicated by the syntax information, wherein each of the tile boundaries is a horizontal or vertical line across the picture, and wherein each of the LCUs is within one of the plurality of tiles and each of the tiles comprises a respective subset of the plurality of the LCUs,
determining a partitioning, indicated by the syntax information, of the picture into a plurality of slices by one or more slice boundaries, wherein the slice boundaries are not constrained to be the same as the tile boundaries, and wherein each of the LCUs is within one of the plurality of slices and each of the slices comprises a respective subset of the plurality of the LCUs,
code, in the bitstream, syntax information that indicates one of a plurality of tile groups to which each of the plurality of tiles is assigned,
wherein the video data comprises first video data of a first tile group of the plurality of tile groups and second video data of a second tile group of the plurality of tile groups, and
wherein the first video data and the second video data are separately included in at least one of: a first one or more NAL units and a second one or more NAL units, a first one or more of the plurality of slices and a second one or more of the plurality of slices, or a first one or more packets and a second one or more packets, and
code the picture, using at least one of the first video data or the second video data, based on the determined partitioning of the picture into the plurality of LCUs, the determined partitioning of the picture into the plurality of tiles, the determined partitioning of the picture into the plurality of slices, and the information that indicates the one of the plurality of tile groups to which each of the plurality of tiles is assigned.

17. The device of claim 16, wherein the syntax information that indicates the one of the plurality of tile groups to which each of the plurality of tiles is assigned comprises, for each of the plurality of tiles of the picture, a selected one of a plurality of tile group IDs associated with the tile, wherein the selected tile group ID for each of the tiles indicates to which of the plurality of tile groups the tile is assigned.

18. The device of claim 16, wherein the tiles assigned to the first tile group are interleaved within the picture with the tiles assigned to the second tile group.

19. The device of claim 16, wherein a subset of the plurality of tile groups forms at least one of an independently decodable sub-picture or a region of interest (ROI).

20. The device of claim 19, wherein the device comprises a video decoder configured to decode the video data, and is further configured to:
request non-delivery of a portion of the video data that is not associated with the subset of tile groups, or
discard the portion of the video data that is not associated with the subset of tile groups.

21. The device of claim 16, wherein the tiles from the first and second tile groups are alternated within the picture to form a checkerboard pattern.

22. The device of claim 16, further comprising:
a video decoder comprising first and second parallel processing cores configured to decode the video data; and
a decapsulation unit configured to:
direct the first video data of the first tile group to the first parallel processing core for decoding the first video data, and
direct the second video data of the second tile group to the second parallel processing core for decoding the second video data.

23. The device of claim 16, further comprising a video decoder configured to reconstruct lost first video data of the first tile group based on the second video data of the second tile group.

24. The device of claim 16, further comprising an encapsulation unit that orders the video data within the bitstream according to the tile groups.

25. The device of claim 16, further comprising:
a video decoder; and
a decapsulation unit configured to provide the video data to the video decoder for decoding the video data in an order based on the tile groups.

26. The device of claim 25,
wherein the syntax information that indicates the one of the plurality of tile groups to which each of the plurality tiles is assigned comprises, for each of the plurality of tiles of the picture, a selected one of a plurality of tile group IDs associated with the tile,
wherein the selected tile group ID indicates to which of the plurality of tile groups the tile is assigned, and
wherein the decapsulation unit is configured to provide the video data in an order based on numerical values of the tile group IDs for the tiles.

27. The device of claim 16, further comprising a video coder configured to:
allow in-picture prediction across tile boundaries for tiles within a common tile group; and
disallow in-picture prediction across tile boundaries for tiles within different tile groups.

28. The device of claim 16, wherein the device is configured to code the syntax information that indicates the one of the plurality of tile groups to which each of the plurality of tiles is assigned in at least one of a sequence parameter set (SPS), picture parameter set (PPS), or adaptation parameter set (APS).

29. The device of claim 16, wherein the slice boundaries are different than the tile boundaries.

30. The device of claim 16, wherein the device comprises at least one of:
an integrated circuit;
a microprocessor; and
a wireless communication device.

31. The device of claim 16, further comprising:
a video decoder comprising a plurality of parallel processing cores configured to decode the video data; and
a decapsulation unit configured to decode, in the bitstream, the information that indicates one of the plurality of tile groups to which each of the plurality of tiles is assigned,
wherein the video data is ordered within the bitstream according to the tile groups such that video data of tiles in the same tile group is presented consecutively in the bitstream, and video data of tiles in one of the plurality of tile groups is presented in the bitstream before video data of tiles in another of the plurality of tile groups, and
wherein the decapsulation unit directs the video data of tiles of different ones of the plurality of tile groups to different ones of the plurality of parallel processing cores of the video decoder for decoding different tile groups in parallel with one another.

32. A device for coding video data comprising:
means for coding the video data and syntax information in a bitstream, wherein the video data comprises a picture, and wherein the means for coding the video data and the syntax information comprises:
means for determining a partitioning, indicated by the syntax information, of the picture into largest coding units (LCUs),
means for determining a partitioning of the picture into a plurality of rectangular tiles by one or more tile boundaries indicated by the syntax information, wherein each of the tile boundaries is a horizontal or vertical line across the picture, and wherein each of the LCUs is within one of the plurality of tiles and each of the tiles comprises a respective subset of the plurality of the LCUs,
means for determining a partitioning, indicated by the syntax information, of the picture into a plurality of slices by one or more slice boundaries, wherein the slice boundaries are not constrained to be the same as the tile boundaries, and wherein each of the LCUs is within one of the plurality of slices and each of the slices comprises a respective subset of the plurality of the LCUs,
means for coding, in the bitstream, syntax information that indicates one of a plurality of tile groups to which each of the plurality of tiles is assigned,
wherein the video data comprises first video data of a first tile group of the plurality of tile groups and second video data of a second tile group of the plurality of tile groups, and
wherein the first video data and the second video data are separately included in at least one of: a first one or more NAL units and a second one or more NAL units, a first one or more of the plurality of slices and a second one or more of the plurality of slices, or a first one or more packets and a second one or more packets, and
means for coding the picture, using at least one of the first video data or the second video data, based on the determined partitioning of the picture into the plurality of LCUs, the determined partitioning of the picture into the plurality of tiles, the determined partitioning of the picture into the plurality of slices, and the information that indicates the one of the plurality of tile groups to which each of the plurality of tiles is assigned.

33. The device of claim 32, wherein the syntax information that indicates the one of the plurality of tile groups to which each of the plurality of tiles is assigned comprises, for each of the plurality of tiles of the picture, a selected one of a plurality of tile group IDs associated with the tile, wherein the selected tile group ID indicates to which of the plurality of tile groups the tile is assigned.

34. The device of claim 32, wherein a subset of the plurality of tile groups forms at least one of an independently decodable sub-picture or a region of interest (ROI).

35. The device of claim 32, further comprising means for parallel coding of the first video data associated with tiles assigned to the first tile group and the second video data associated with tiles assigned to the second tile group.

36. The device of claim 32, further comprising means for decoding the video data in an order based on the tile groups.

37. The device of claim 36,
wherein the syntax information that indicates the one of the plurality of tile groups to which each of the plurality of tiles is assigned comprises, for each of the plurality of tiles of the picture, a selected one of a plurality of tile group IDs associated with the tile,
wherein the selected tile group ID indicates to which the plurality of tile groups the tile is assigned, and
wherein the means for decoding the video data in an order based on the tile groups comprises means for decoding the video data in an order based on numerical values of the tile group IDs for the tiles.

38. The device of claim 32,
wherein the means for coding the video data comprises means for decoding the video data,
wherein the means for coding, in the bitstream, information that indicates one of a plurality of tile groups to which each of the plurality of tiles is assigned comprises means for decoding, in the bitstream, the information that indicates one of the plurality of tile groups to which each of the plurality of tiles is assigned,
  wherein the video data is ordered within the bitstream according to the tile groups such that video data of tiles in the same tile group is presented consecutively in the bitstream, and video data of tiles in one of the plurality of tile groups is presented in the bitstream before video data of tiles in another of the plurality of tile groups, and
  wherein the means for decoding the video data comprises means for directing the video data of tiles of different ones of the plurality of tile groups to different parallel processing cores of a video coder for decoding different tile groups in parallel with one another.

39. A non-transitory computer-readable storage medium having stored thereon instructions for execution by a processor of a device for coding video data wherein, when executed, the instructions cause the processor to:
  code the video data and syntax information in a bitstream, wherein the video data comprises a picture, and wherein the instructions that cause the processor to code the video data and the syntax information comprise instructions that cause the processor to:
    determine a partitioning, indicated by the syntax information, of the picture into largest coding units (LCUs),
    determine a partitioning of the picture is into a plurality of rectangular tiles by one or more tile boundaries indicated by the syntax information, wherein each of the tile boundaries is a horizontal or vertical line across the picture, and wherein each of the LCUs is within one of the plurality of tiles and each of the tiles comprises a respective subset of the plurality of the LCUs,
    determine a partitioning, indicated by the syntax information, of the picture into a plurality of slices by one or more slice boundaries, wherein the slice boundaries are not constrained to be the same as the tile boundaries, and wherein each of the LCUs is within one of the plurality of slices and each of the slices comprises a respective subset of the plurality of the LCUs,
    code, in the bitstream, syntax information that indicates one of a plurality of tile groups to which each of the plurality of tiles is assigned,
    wherein the video data comprises first video data of a first tile group of the plurality of tile groups and second video data of a second tile group of the plurality of tile groups, and
    wherein the first video data and the second video data are separately included in at least one of: a first one or more NAL units and a second one or more NAL units, a first one or more of the plurality of slices and a second one or more of the plurality of slices, or a first one or more packets and a second one or more packets, and
    code the picture, using at least one of the first video data or the second video data, based on the determined partitioning of the picture into the plurality of LCUs, the determined partitioning of the picture into the plurality of tiles, the determined partitioning of the picture into the plurality of slices, and the information that indicates the one of the plurality of tile groups to which each of the plurality of tiles is assigned.

40. The computer-readable storage medium of claim 39, wherein the syntax information that indicates the one of the plurality of tile groups to which each of the plurality of tiles is assigned comprises, for each of the plurality of tiles of the picture, a selected one of a plurality of tile group IDs associated with the tile, wherein the selected tile group ID indicates to which of the plurality of tile groups the tile is assigned.

41. The computer-readable storage medium of claim 39, wherein a subset of the plurality of tile groups forms at least one of an independently decodable sub-picture or a region of interest (ROI).

42. The computer-readable storage medium of claim 39, wherein the instructions cause the processor to code the first video data associated with tiles assigned to the first tile group in parallel with the second video data associated with tiles assigned to the second tile group.

43. The computer-readable storage medium of claim 39, wherein the instructions cause the processor to decode the video data in an order based on the tile groups.

44. The computer-readable storage medium of claim 43,
  wherein syntax the information that indicates the one of the plurality of tile groups to which each of the plurality of tiles is assigned comprises, for each of the plurality of tiles of the picture, a selected one of a plurality of tile group IDs associated with the tile,
  wherein the selected tile group ID indicates to which the plurality of tile groups the tile is assigned, and
  wherein the instructions that cause the device to decode the video data in an order based on the tile groups comprise instructions that cause the device to decode the video data in an order based on numerical values of the tile group IDs for the tiles.

45. The computer-readable storage medium of claim 39,
  wherein the instructions that cause the processor to code the video data comprise instructions that cause the processor to decode the video data,
  wherein the instructions that cause the processor to code, in the bitstream, information that indicates one of a plurality of tile groups to which each of the plurality of tiles is assigned comprise instructions that cause the processor to decode, in the bitstream, the information that indicates one of the plurality of tile groups to which each of the plurality of tiles is assigned,
  wherein the video data is ordered within the bitstream according to the tile groups such that video data of tiles in the same tile group is presented consecutively in the bitstream, and video data of tiles in one of the plurality of tile groups is presented in the bitstream before video data of tiles in another of the plurality of tile groups, and
  wherein the instructions that cause the processor to decode the video data comprise instructions that cause the processor to direct the video data of tiles of different ones of the plurality of tile groups to different parallel processing cores of a video coder for decoding different tile groups in parallel with one another.

46. A method of encoding video data and syntax information in a bitstream, wherein the video data comprises a picture, the method comprising:
  determining a partitioning of the picture into largest coding units (LCUs);
  determining a partitioning of the picture into a plurality of rectangular tiles by one or more tile boundaries, wherein each of the tile boundaries is a horizontal or vertical line across the picture, and wherein each of the LCUs is within one of the plurality of rectangular tiles and each of the rectangular tiles comprises a respective subset of the plurality of the LCUs;

determining a partitioning of the picture into a plurality of slices by one or more slice boundaries, wherein the slice boundaries are not constrained to be the same as the tile boundaries, and wherein each of the LCUs is within one of the plurality of slices and each of the slices comprises a respective subset of the plurality of the LCUs;

encoding, in the bitstream, syntax information that indicates the partitioning of the picture into the LCUs, the one or more tile boundaries, and the partitioning of the picture into the plurality of slices;

assigning each of the plurality of tiles to one of a plurality of tile groups;

encoding, in the bitstream, syntax information that indicates the one of the plurality of tile groups to which each of the plurality of tiles is assigned; and encoding the video data in the bitstream, wherein the video data comprises first video data of a first tile group of the plurality of tile groups and second video data of a second tile group of the plurality of tile groups, and wherein encoding the video data in the bitstream comprises separately including the first video data and the second video data in at least one of: a first one or more NAL units and a second one or more NAL units, a first one or more of the plurality of slices and a second one or more of the plurality of slices, or a first one or more packets and a second one or more packets.

47. The method of claim 46, wherein the syntax information that indicates the one of the plurality of tile groups to which each of the plurality of tiles is assigned comprises, for each of the plurality of tiles of the picture, a selected one of a plurality of tile group IDs associated with the tile, wherein the selected tile group ID indicates to which of the tile groups the tile is assigned.

48. The method of claim 46, wherein the tiles assigned to the first tile group are interleaved within the picture with the tiles assigned to the second tile group.

49. The method of claim 46, wherein a subset of the plurality of tile groups forms at least one of an independently decodable sub-picture or a region of interest (ROI).

50. The method of claim 46, wherein the tiles from the first and second tile groups are alternated within the picture to form a checkerboard pattern.

51. The method of claim 46, further comprising ordering the video data within the bitstream according to the tile groups.

52. The method of claim 46, further comprising:
allowing in-picture prediction across tile boundaries for tiles within a common tile group; and
disallowing in-picture prediction across tile boundaries for tiles within different tile groups.

53. The method of claim 46, wherein encoding, in the bitstream, the syntax information that indicates the one of the plurality of tile groups to which each of the plurality of tiles is assigned comprises encoding the syntax information in at least one of a sequence parameter set (SPS), picture parameter set (PPS), or adaptation parameter set (APS).

54. The method of claim 46, wherein the slice boundaries are different than the tile boundaries.

* * * * *